(12) United States Patent
Jinbo et al.

(10) Patent No.: US 9,486,728 B2
(45) Date of Patent: Nov. 8, 2016

(54) HONEYCOMB FILTER AND PRODUCTION METHOD FOR HONEYCOMB FILTER

(71) Applicant: IBIDEN CO., LTD., Ogaki-shi (JP)

(72) Inventors: Naoyuki Jinbo, Ibi-gun (JP); Takafumi Kasuga, Ibi-gun (JP); Misako Makino, Ibi-gun (JP); Saiduzzaman Md, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 155 days.

(21) Appl. No.: 14/501,034

(22) Filed: Sep. 30, 2014

(65) Prior Publication Data

US 2015/0017075 A1 Jan. 15, 2015

Related U.S. Application Data

(63) Continuation of application No. PCT/JP2012/058744, filed on Mar. 30, 2012.

(51) Int. Cl.
*B01D 50/00* (2006.01)
*B01D 46/24* (2006.01)
(Continued)

(52) U.S. Cl.
CPC ....... *B01D 46/2451* (2013.01); *B01D 39/2075* (2013.01); *B01D 46/0001* (2013.01); *B01D 46/2429* (2013.01); *B01D 46/2474* (2013.01); *B01D 53/8678* (2013.01); *B01J 35/04* (2013.01); *B05D 1/02* (2013.01); *C04B 35/565* (2013.01); *C04B 37/005* (2013.01); *C04B 41/009* (2013.01); *C04B 41/5089* (2013.01); *C04B 41/85* (2013.01); *F01N 3/0222* (2013.01); *F01N 3/035* (2013.01); *F01N 3/2066* (2013.01);
(Continued)

(58) Field of Classification Search
CPC ............ F01N 3/035; F01N 2510/068; F01N 3/2066; B01D 46/2429; B01D 46/2466; C04B 2237/083
USPC ............... 422/177, 180; 55/523; 502/439
See application file for complete search history.

(56) References Cited

U.S. PATENT DOCUMENTS 5,318,755 A * 6/1994 Kuivalainen ...... B01D 46/0023
422/171
6,004,521 A * 12/1999 Miyoshi ............... B01D 53/945
423/213.5
(Continued)

FOREIGN PATENT DOCUMENTS

EP 2324904 5/2011
JP 01-168311 7/1989
(Continued)

*Primary Examiner* — Tom P Duong
(74) *Attorney, Agent, or Firm* — Mori & Ward, LLP

(57) ABSTRACT

A honeycomb filter includes a ceramic honeycomb substrate, an auxiliary filter layer, an SCR catalyst, and a portion. The ceramic honeycomb substrate has cell walls provided along a longitudinal direction of the ceramic honeycomb substrate to define cells through which fluid is to pass and which have a fluid inlet end and a fluid outlet end opposite to the fluid inlet end along the longitudinal direction. The cells include first cells and second cells. The auxiliary filter layer is provided on first surfaces of first cell walls of the first cells. The SCR catalyst is supported on second surfaces of second cell walls of the second cells. The second surfaces substantially correspond to the first surfaces. The portion satisfies a<b. "a" (μm) represents an average pore diameter of pores of the auxiliary filter layer, and "b" (μm) represents an average particle diameter of particles constituting the SCR catalyst.

20 Claims, 7 Drawing Sheets

(51) Int. Cl.
    *C04B 41/85*     (2006.01)
    *C04B 35/565*     (2006.01)
    *C04B 37/00*     (2006.01)
    *C04B 41/00*     (2006.01)
    *C04B 41/50*     (2006.01)
    *B01J 35/04*     (2006.01)
    *F01N 3/20*     (2006.01)
    *F01N 3/022*     (2006.01)
    *F01N 3/035*     (2006.01)
    *B01D 39/20*     (2006.01)
    *B01D 46/00*     (2006.01)
    *B01D 53/86*     (2006.01)
    *B05D 1/02*     (2006.01)
    *C04B 111/00*     (2006.01)
    *B01J 29/06*     (2006.01)

(52) U.S. Cl.
    CPC ... *B01D46/2466* (2013.01); *B01D 2046/2437* (2013.01); *B01J 29/06* (2013.01); *C04B 2111/00793* (2013.01); *C04B 2235/5224* (2013.01); *C04B 2235/5445* (2013.01); *C04B 2235/5472* (2013.01); *C04B 2237/083* (2013.01); *C04B 2237/09* (2013.01); *C04B 2237/365* (2013.01); *F01N 2510/00* (2013.01); *F01N 2510/063* (2013.01); *F01N 2510/068* (2013.01); *Y02T 10/24* (2013.01)

(56) References Cited

U.S. PATENT DOCUMENTS

| | | | |
|---|---|---|---|
| 2009/0199546 A1* | 8/2009 | Doring | B01D 53/9431 60/297 |
| 2011/0120089 A1* | 5/2011 | Koch | B01D 53/944 60/274 |
| 2011/0212831 A1* | 9/2011 | Goto | B01D 46/2474 502/100 |

FOREIGN PATENT DOCUMENTS

| | | | |
|---|---|---|---|
| JP | 2007-144371 | | 6/2007 |
| JP | 2009220029 | * | 1/2009 |
| JP | 2009-112962 | | 5/2009 |
| JP | 2011-104524 | | 6/2011 |
| WO | WO 2011/042992 | | 4/2011 |
| WO | WO 2012/030533 | | 3/2012 |

\* cited by examiner

A-A line cross-sectional view

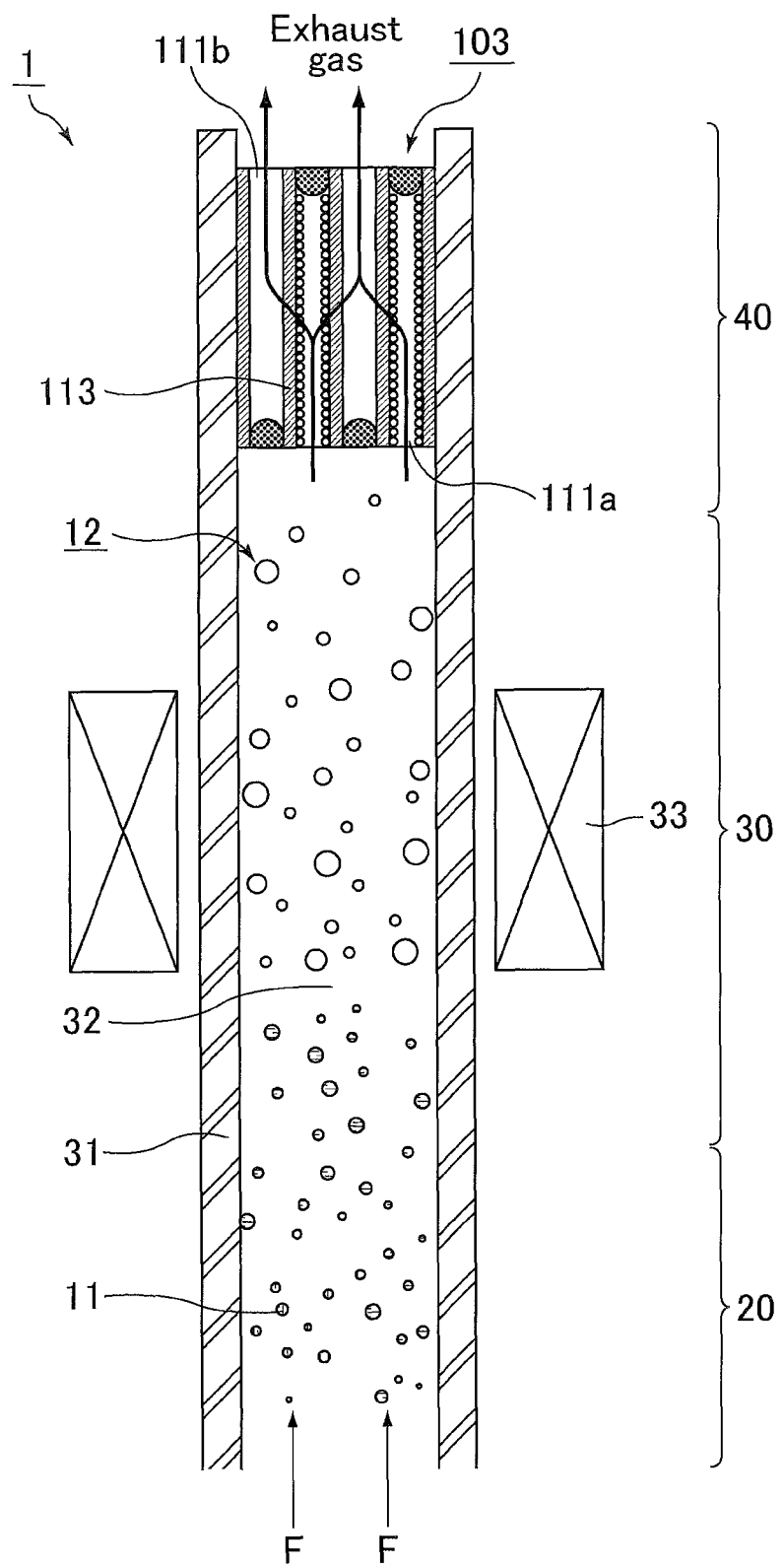

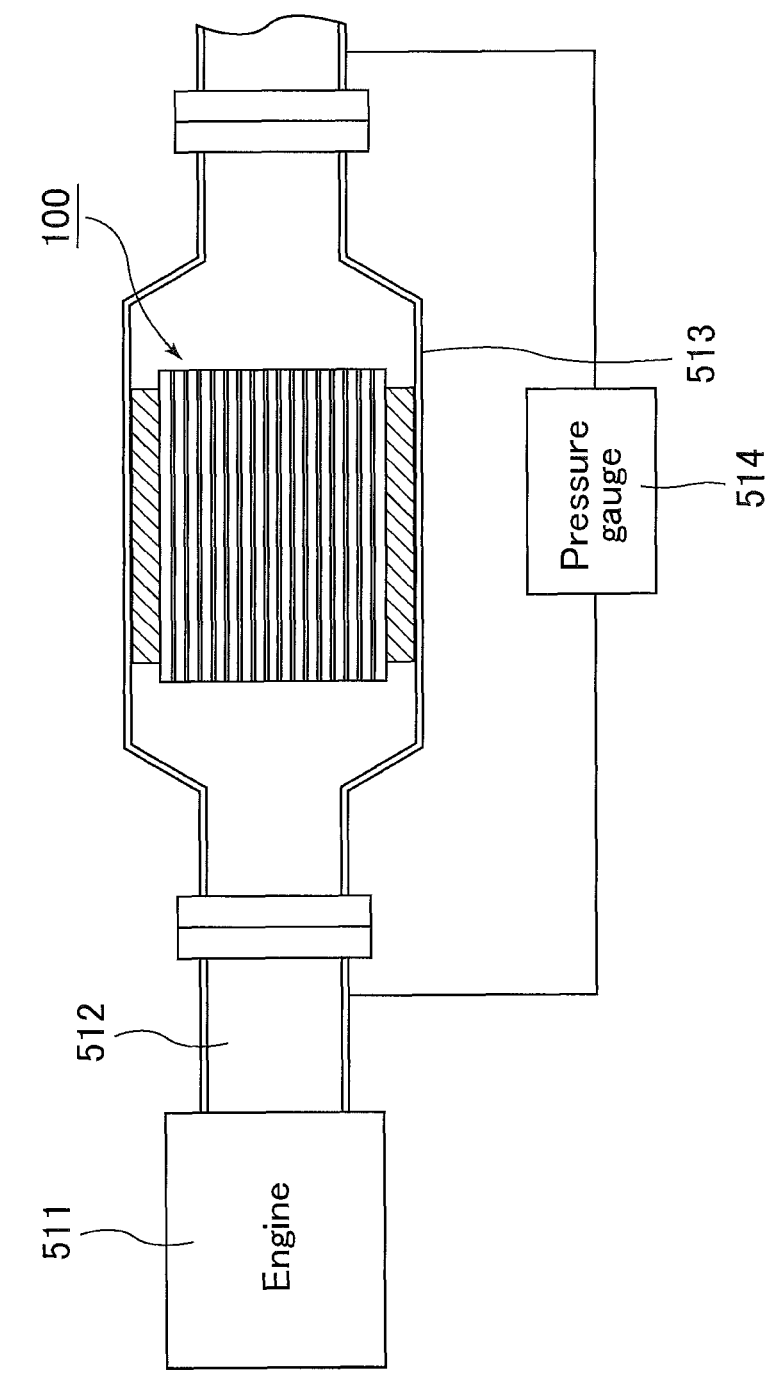

HONEYCOMB FILTER AND PRODUCTION METHOD FOR HONEYCOMB FILTER

CROSS-REFERENCE TO RELATED APPLICATIONS

The present application is a continuation application of International Application No. PCT/JP2012/058744, filed Mar. 30, 2012. The contents of this International Application are incorporated herein by reference in their entirety.

BACKGROUND OF THE INVENTION

Field of the Invention

The present invention relates to a honeycomb filter and a production method for a honeycomb filter.

Discussion of the Background

Particulate matter (hereinafter, also referred to as "PM") such as soot is contained in exhaust gases discharged from internal combustion engines such as diesel engines, and has raised problems as contaminants harmful to the environment and the human body. Also, people have been worried about influence of toxic gas components such as CO, HC, and NOx contained in exhaust gases on the environment and the human body as well.

For the above reasons, exhaust gas purifying apparatuses for collecting PM or converting toxic gas component in exhaust gases have been used.

Honeycomb structures made of ceramics or the like are used for manufacturing the exhaust gas purifying apparatuses. When exhaust gases are passed through the honeycomb structure, those gases can be converted.

A honeycomb structure for collecting PM in exhaust gases in an exhaust gas purifying apparatus has a large number of cells each sealed at either end thereof and placed longitudinally in parallel with one another with a cell wall interposed therebetween. Therefore, exhaust gases flowing into one of the cells surely pass through the cell wall separating the cells and then flow out from other cells. Therefore, when a honeycomb structure of this kind is installed in an exhaust gas purifying apparatus, PM contained in exhaust gases are collected by the cell walls upon passing through the honeycomb structure. The cell walls of the honeycomb structure function as filters through which the exhaust gases are purified.

In an initial stage of collecting PM in the honeycomb structure, PM enters into a pore of the cell wall, and is collected in the cell wall to clog the pore of the cell wall, so that a so-called "depth filtration" state is generated. In the depth filtration state, PM is deposited in (the pore of) the cell wall. For this reason, immediately after start of PM collecting, there is a problem that the substantial porosity of the cell wall decreases, and a pressure loss rapidly increases.

On the other hand, as a honeycomb structure to be used for converting NOx in exhaust gases in an exhaust gas purifying apparatus, a honeycomb structure for converting NOx in which no end of the cells is sealed and a catalyst for converting NOx is supported on cell walls has been used.

A urea SCR (Selective Catalytic Reduction) device has recently been proposed for converting NOx in exhaust gases.

In the urea SCR device, an aqueous urea solution is sprayed in an exhaust gas purifying apparatus provided with a honeycomb structure in which an SCR catalyst such as zeolite is supported on cell walls. Ammonia is generated due to thermal decomposition of the urea, and the action of zeolite reduces NOx.

Accordingly, a urea SCR device can convert NOx.

Conventionally, a honeycomb structure for collecting PM in exhaust gases and a honeycomb structure for converting NOx are different members, and respectively disposed in different metal casings, and thus they have a large volume in an exhaust gas line. For this reason, decrease of the volume occupied by the exhaust gas purifying apparatus has been desired.

Under such circumstances, a honeycomb filter allowed to support an SCR catalyst such as zeolite on the honeycomb structure for collecting PM in exhaust gases, that is, the honeycomb structure in which each of the cells is sealed at either end thereof has been developed. The honeycomb filter can collect PM in exhaust gases as well as convert NOx.

International Publication WO 2011/042992 discloses a technique of increasing the NOx conversion rate, when the honeycomb filter is applied in the urea SCR device, by controlling the porosity of cell walls of the honeycomb structure.

SUMMARY OF THE INVENTION

According to one aspect of the present invention, a honeycomb filter includes a ceramic honeycomb substrate, an auxiliary filter layer, an SCR catalyst, and a portion. The ceramic honeycomb substrate has cell walls provided along a longitudinal direction of the ceramic honeycomb substrate to define cells through which fluid is to pass and which have a fluid inlet end and a fluid outlet end opposite to the fluid inlet end along the longitudinal direction. The cells include first cells and second cells. Each of the first cells includes an inlet opening end at the fluid inlet end and an outlet closed end at the fluid outlet end. Each of the second cells includes an inlet closed end at the fluid inlet end and an outlet opening end at the fluid outlet end. The auxiliary filter layer is provided on first surfaces of first cell walls of the first cells. The SCR catalyst is supported on second surfaces of second cell walls of the second cells. The second surfaces substantially correspond to the first surfaces. The portion satisfies a<b. "a" (μm) represents an average pore diameter of pores of the auxiliary filter layer, and "b" (μm) represents an average particle diameter of particles constituting the SCR catalyst.

According to another aspect of the present invention, in a production method for a honeycomb filter, a porous honeycomb fired body is produced using a ceramic powder. The porous honeycomb fired body has cell walls provided along a longitudinal direction of the porous honeycomb fired body to define cells through which fluid is to pass and which have a fluid inlet end and a fluid outlet end opposite to the fluid inlet end along the longitudinal direction. The cells include first cells and second cells. Each of the first cells includes an inlet opening end at the fluid inlet end and an outlet closed end at the fluid outlet end. Each of the second cells includes an inlet closed end at the fluid inlet end and an outlet opening end at the fluid outlet end. Droplets containing a raw material for ceramic particles are dispersed in carrier gas. The carrier gas is introduced into the first cells to provide an auxiliary filter layer on a first surface of first cell walls of the first cells. The SCR catalyst is applied into the second cells to support SCR catalyst on second cell walls of the second cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is a sectional view schematically showing an embodiment of a droplet dispersion step and a carrier gas introducing step.

FIG. 8 is a view for describing a pressure loss measurement apparatus.

DESCRIPTION OF THE EMBODIMENTS

Figure 1:
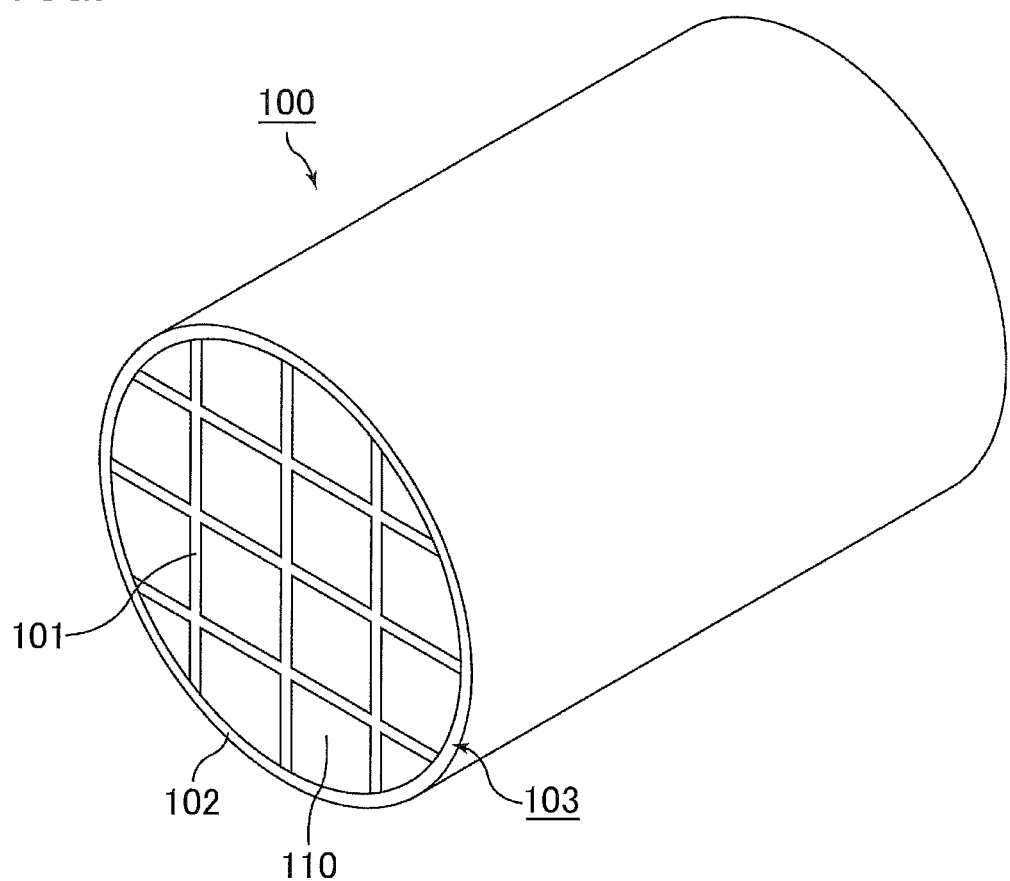
FIG. 1 is a perspective view schematically showing an example of the honeycomb filter according to a first embodiment of the present invention.

The embodiments will now be described with reference to the accompanying drawings, wherein like reference numerals designate corresponding or identical elements throughout the various drawings.

A honeycomb filter according to a first aspect of the embodiments of the present invention includes:

a ceramic honeycomb substrate having a large number of cells placed longitudinally in parallel with one another with a cell wall interposed therebetween, each of the cells passing fluid therethrough and being sealed at either a fluid inlet end or a fluid outlet end of the cell;

an auxiliary filter layer formed on a surface of the cell wall of the cell opened at the fluid inlet end and sealed at the fluid outlet end in the surface of the cell wall; and an SCR catalyst supported on a surface of the cell wall of the cell sealed at the fluid inlet end and opened at the fluid outlet end, in the cell wall on which the auxiliary filter layer is formed, wherein the honeycomb filter includes a portion that satisfies a<b, given that an average pore diameter of pores of the auxiliary filter layer is a (μm), and an average particle diameter of particles constituting the SCR catalyst is b (μm).

In the honeycomb filter according to the first aspect of the embodiments of the present invention, the auxiliary filter layer is formed on the surface of the cell wall of the cell opened at the fluid inlet end and sealed at the fluid outlet end in the ceramic honeycomb substrate. PM in exhaust gases is collected by the auxiliary filter layer.

On the other hand, the SCR catalyst is supported on the surface of the cell wall of the cell sealed at the fluid inlet end and opened at the fluid outlet end, in the cell wall on which the auxiliary filter layer is formed.

Accordingly, contact between the collected PM and the SCR catalyst is prevented and thus, in regeneration process of burning PM, deterioration of the SCR catalyst due to heat can be suppressed. This ensures the NOx conversion capability for a long time.

Further, in the honeycomb filter according to the first aspect of the embodiments of the present invention, the honeycomb filter includes a portion that satisfies a<b, given that an average pore diameter of pores of the auxiliary filter layer is a (μm), and an average particle diameter of particles constituting the SCR catalyst is b (μm).

When the average pore diameter a of pores of the auxiliary filter layer is smaller than the average particle diameter b of particles constituting the SCR catalyst, the auxiliary filter layer is hardly clogged with the SCR catalyst. This can suppress an increase in the pressure loss.

In the honeycomb filter according to a second aspect of the embodiments of the present invention, a is from 0.5 to 3.0 μm, and b is from 0.7 to 5.0 μm.

When a is less than 0.5 μm, gas hardly permeates the auxiliary filter layer so that the permeation resistance is large. On the other hand, when a exceeds 3.0 μm, PM easily passes through the auxiliary filter layer so that a sufficient PM collecting efficiency is hardly obtained.

When b is less than 0.7 μm, the particles constituting the SCR catalyst are too small so that the auxiliary filter layer is easily clogged with the particles. On the other hand, when b exceeds 5.0 μm, the auxiliary filter layer is hardly clogged with the particles constituting the SCR catalyst, but the specific surface area of the particles becomes small so that a sufficient NOx conversion rate is hardly obtained.

In the honeycomb filter according to a third aspect of the embodiments of the present invention, the portion that satisfies a<b is 40% or less of the entire honeycomb filter.

By allowing the portion that satisfies a<b to be 40% or less of the entire honeycomb filter, clogging of the auxiliary filter layer with the SCR catalyst can be prevented. Therefore, this suppresses an increase in pressure loss.

In the honeycomb filter according to a fourth aspect of the embodiments of the present invention, an average pore diameter of the cell wall is from 15 to 30 μm.

When the average pore diameter of the cell wall is less than 15 μm, the pressure loss after the SCR catalyst is supported on the cell walls tends to increase. On the other hand, when the average pore diameter of the cell wall exceeds 30 μm, it is difficult to form the auxiliary filter layer on the surface of the cell wall.

In the honeycomb filter according to a fifth aspect of the embodiments of the present invention, an amount of the supported SCR catalyst is from 80 to 200 g/L.

When the amount of the supported SCR catalyst is from 80 to 200 g/L, NOx in exhaust gases can be sufficiently converted in the case of using the honeycomb filter in the urea SCR device.

When the amount of the supported SCR catalyst is less than 80 g/L, the NOx conversion performance of the honeycomb filter for the urea SCR device is not sufficient. On the other hand, when the amount of the supported SCR catalyst exceeds 200 g/L, the cells are clogged with the SCR catalyst, and the pressure loss tends to increase even in the non-deposition state of PM.

In the honeycomb filter according to a sixth aspect of the embodiments of the present invention, a porosity of the cell walls is from 55 to 70%.

When the porosity of the cell walls of the ceramic honeycomb substrate is from 55 to 70%, a large amount of the SCR catalyst can be supported on the cell walls.

When the porosity of the cell walls is less than 55%, the pores of the cell walls are clogged with the SCR catalyst in the case where a large amount of the SCR catalyst is supported on the ceramic honeycomb substrate, so that exhaust gases hardly passes through the cell walls. Accordingly, the exhaust gases hardly diffuse, and the effect of the SCR catalyst is hardly to be sufficiently exerted. On the other hand, when the porosity of the cell walls exceeds 70%, the strength of the ceramic honeycomb substrate tends to decrease.

In the honeycomb filter according to a seventh aspect of the embodiments of the present invention, a thickness of the auxiliary filter layer is from 3 to 60 µm.

When the thickness of the auxiliary filter layer is less than 3 µm, the auxiliary filter layer is too thin so that PM is hardly collected. On the other hand, when the thickness of the auxiliary filter layer exceeds 60 µm, the auxiliary filter layer becomes too thick so that the pressure loss tends to increase.

In the honeycomb filter according to an eighth aspect of the embodiments of the present invention, the auxiliary filter layer is made of a heat-resistant oxide.

In the honeycomb filter according to a ninth aspect of the embodiments of the present invention, the heat-resistant oxide is at least one selected from the group consisting of alumina, silica, mullite, ceria, cordierite, zirconia, and titania.

If the auxiliary filter layer is made of the heat-resistant oxide, failures such as melting of the auxiliary filter layer in the regeneration process of burning PM are not caused. Thus, a honeycomb filter having excellent heat resistance can be obtained.

In the honeycomb filter according to a tenth aspect of the embodiments of the present invention, the auxiliary filter layer includes hollow particles.

In the honeycomb filter according to an eleventh aspect of the embodiments of the present invention, the SCR catalyst is zeolite.

In the honeycomb filter according to a twelfth aspect of the embodiments of the present invention, the SCR catalyst is not supported on a surface of the auxiliary filter layer.

In this case, in the regeneration process of burning PM, deterioration of the SCR catalyst due to heat can be suppressed.

In the honeycomb filter according to a thirteenth aspect of the embodiments of the present invention, more SCR catalyst is supported on the surface of the cell wall of the cell sealed at the fluid inlet end and opened at the fluid outlet end than the surface of the cell wall of the cell opened at the fluid inlet end and sealed at the fluid outlet end.

In this case, contact between the collected PM and the SCR catalyst can be prevented.

A production method for a honeycomb filter according to a fourteenth aspect of the embodiments of the present invention is a production method for the honeycomb filter according to any one of the first to thirteenth aspects of the embodiments of the present invention. The method includes:

a honeycomb fired body production step of producing a porous honeycomb fired body by using a ceramic powder, the porous honeycomb fired body having a large number of cells placed longitudinally in parallel with one another with a cell wall interposed therebetween, each of the cells being sealed at either a fluid inlet end or a fluid outlet end of the cell;

an auxiliary filter layer formation step of forming an auxiliary filter layer on a surface of the cell wall; and a catalyst application step of supporting an SCR catalyst on the cell wall; wherein the auxiliary filter layer formation step includes:

a droplet dispersion step of dispersing droplets containing a raw material for ceramic particles in carrier gas; and a carrier gas introducing step of introducing the carrier gas into the cell opened at the fluid inlet end and sealed at the fluid outlet end, and in the catalyst application step, the SCR catalyst is supported on the cell walls by applying the SCR catalyst into the cell sealed at the fluid inlet end and opened at the fluid outlet end.

In the production method for the honeycomb filter according to the fourteenth aspect of the embodiments of the present invention, in the carrier gas introducing step, the carrier gas containing ceramic particles formed in a below-mentioned drying step and so on is introduced to the cell from the fluid inlet end. As a result, the ceramic particles are deposited on the surface of the cell wall of the cell opened at the fluid inlet end and sealed at the fluid outlet end to form the auxiliary filter layer.

In the catalyst application step, the SCR catalyst is applied into the cell from the fluid outlet side, that is, the opposite side to the side from which the carrier gas is introduced in the carrier gas introducing step.

In other words, the direction in which the carrier gas is introduced in the carrier gas introducing step is opposite to the direction in which the SCR catalyst is applied in the catalyst application step. The SCR catalyst is supported on only the cell wall out of the cell wall and the auxiliary filter layer, or is supported on both the cell wall and the auxiliary filter layer, and the amount per unit volume of the SCR catalyst supported on the cell wall is larger than that of the SCR catalyst supported on the auxiliary filter layer.

Therefore, the amount of the SCR catalyst further from collected PM can be made relatively large. That is, the amount of the SCR catalyst that does not deteriorate due to heat in the regeneration process of burning PM can be made large, ensuring the NOx conversion capability for a long time.

In the production method for the honeycomb filter according to the fourteenth aspect of the embodiments of the present invention, the produced honeycomb filter includes a portion that satisfies a<b, given that an average pore diameter of pores of the auxiliary filter layer is a (µm), and an average particle diameter of particles constituting the SCR catalyst is b (µm).

Therefore, in the catalyst application step, clogging of the auxiliary filter layer with the SCR catalyst can be prevented. As a result, the honeycomb filter having a low pressure loss can be produced.

In the production method for the honeycomb filter according to a fifteenth aspect of the embodiments of the present invention, in the droplet dispersion step, the droplets are dispersed in the carrier gas by spraying.

By dispersing the droplets in the carrier gas by spraying, spherical droplets can be manufactured. The spherical droplets generate spherical ceramic particles, and the spherical ceramic particles can be deposited on the surface of the cell wall.

In the production method for the honeycomb filter according to a sixteenth aspect of the embodiments of the present invention, the droplets contain a heat-resistant oxide precursor that forms a heat-resistant oxide by heating, the heat-resistant oxide being a raw material for the ceramic particles.

When the droplets contain the heat-resistant oxide precursor, particles of the heat-resistant oxide can be obtained by heating the carrier gas. Then, by introducing the particles of the heat-resistant oxide into the cell, the auxiliary filter layer made of the particles of the heat-resistant oxide can be formed.

Alternatively, by introducing droplets containing the heat-resistant oxide precursor into the cell and then, heating the heat-resistant oxide precursor to form particles of the heat-resistant oxide, the auxiliary filter layer made of the particles of the heat-resistant oxide can be formed.

The production method for the honeycomb filter according to a seventeenth aspect of the embodiments of the present invention further includes a drying step of drying the carrier gas at 100 to 800° C.

By heating the carrier gas, for example, as described above, the auxiliary filter layer made of the particles of the heat-resistant oxide can be formed.

The production method for the honeycomb filter according to an eighteenth aspect of the embodiments of the present invention further includes a heating step of heating the ceramic honeycomb substrate into which the carrier gas is introduced to 900 to 1500° C.

By heating the ceramic honeycomb substrate into which the carrier gas is introduced, for example, as described above, the auxiliary filter layer made of the particles of the heat-resistant oxide can be formed.

In the production method for the honeycomb filter according to a nineteenth aspect of the embodiments of the present invention, the droplets contain the heat-resistant oxide precursor that forms a heat-resistant oxide by heating, the heat-resistant oxide being a raw material for the ceramic particles, and in the drying step, the ceramic particles are formed from the droplets, each of the ceramic particles having a spherical shape.

In the production method for the honeycomb filter according to a twentieth aspect of the embodiments of the present invention, in the carrier gas introducing step, the ceramic particles are deposited on the surface of the cell wall to form the auxiliary filter layer.

An embodiment of the present invention will be specifically described. However, the present invention is not limited to the embodiment, and may be appropriately modified and applied so as not to deviate from the subject matter of the present invention.

First Embodiment

The following description will discuss the first embodiment of the present invention, which is one embodiment of a honeycomb filter and a production method for a honeycomb filter according to the embodiment of the present invention.

First, the honeycomb filter according to the first embodiment of the present invention will be described.

The honeycomb filter according to the first embodiment of the present invention includes:

a ceramic honeycomb substrate having a large number of cells placed longitudinally in parallel with one another with a cell wall interposed therebetween, each of the cells passing fluid therethrough and being sealed at either a fluid inlet end or a fluid outlet end of the cell;

an auxiliary filter layer formed on a surface of the cell wall of the cell opened at the fluid inlet end and sealed at the fluid outlet end in the surface of the cell wall; and an SCR catalyst supported on a surface of the cell wall of the cell sealed at the fluid inlet end and opened at the fluid outlet end, in the cell wall on which the auxiliary filter layer is formed, wherein the honeycomb filter includes a portion that satisfies a<b, given that an average pore diameter of pores of the auxiliary filter layer is a (μm), and an average particle diameter of particles constituting the SCR catalyst is b (μm).

In the honeycomb filter according to the first embodiment of the present invention, the ceramic honeycomb substrate (ceramic block) is configured of a plurality of honeycomb fired bodies. The large number of cells of the honeycomb fired bodies constituting the honeycomb filter include large volume cells and small volume cells, and each of the large volume cells has a larger area of the cross section perpendicular to the longitudinal direction than each of the small volume cells.

The honeycomb filter according to the first embodiment of the present invention includes the auxiliary filter layer formed on the surface of the cell wall of the ceramic honeycomb substrate including the honeycomb fired bodies.

In this specification, the "ceramic honeycomb substrate" having no auxiliary filter layer on the surface of the cell wall and the "honeycomb filter" having the auxiliary filter layer on the surface of the cell wall are distinguished from each other.

In the following explanation, the expression of the cross section of the honeycomb fired body refers to the cross section of the honeycomb fired body perpendicular to the longitudinal direction. Similarly, the expression of the cross-sectional area of the honeycomb fired body refers to the area of the cross section of the honeycomb fired body perpendicular to the longitudinal direction.

FIG. 1 is a perspective view schematically showing an example of the honeycomb filter according to the first embodiment of the present invention.

Figure 2A:
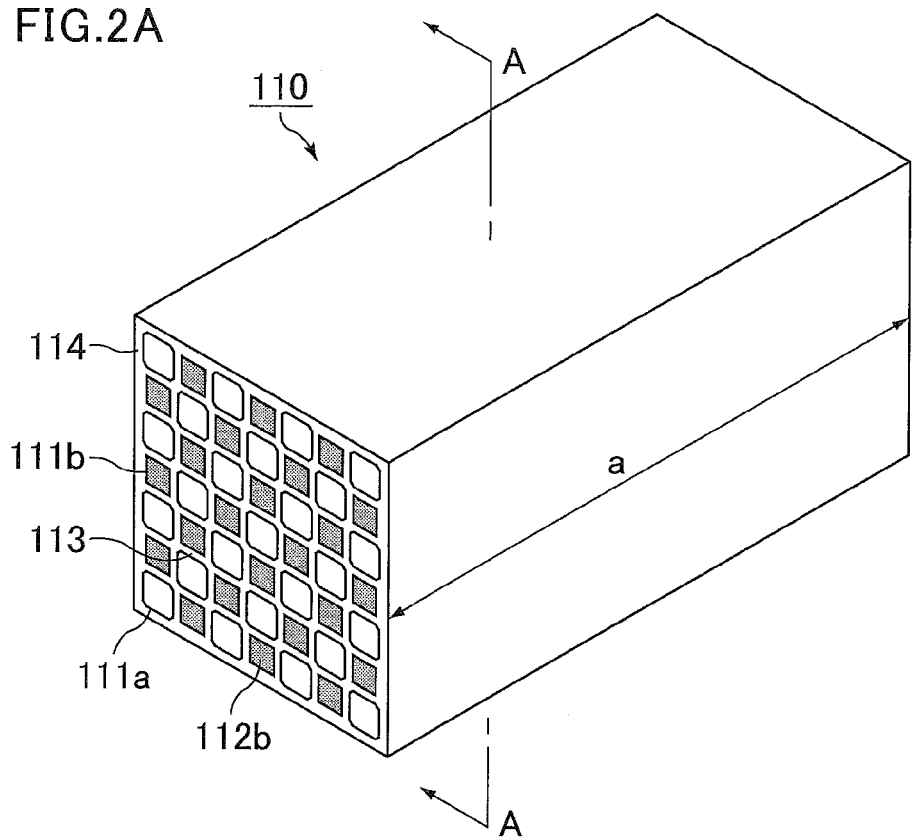
FIG. 2A is a perspective view schematically showing an example of a honeycomb fired body constituting the honeycomb filter shown in FIG. 1.
Figure 2B:
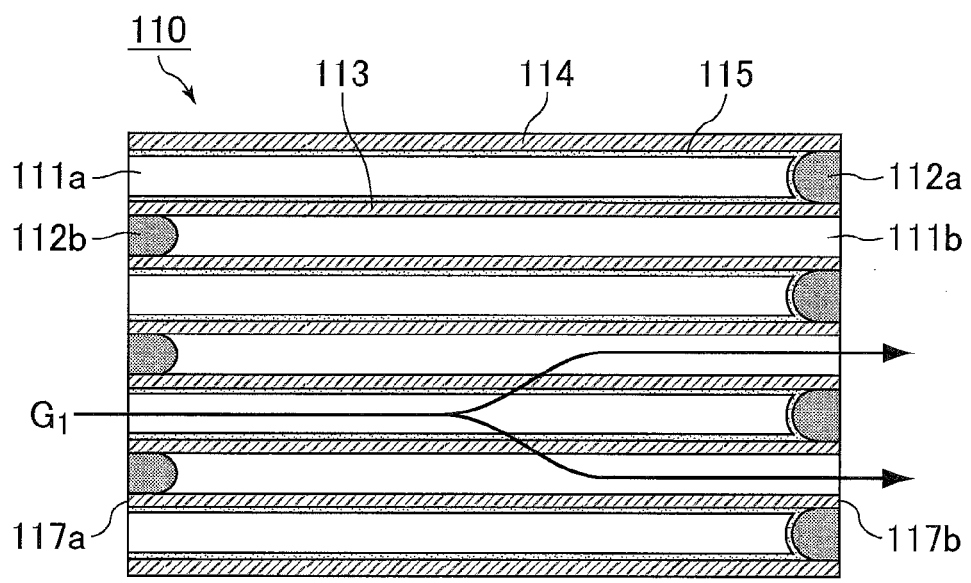
FIG. 2B is an A-A line cross-sectional view of the honeycomb fired body shown in FIG. 2A.

FIG. 2A is a perspective view schematically showing an example of a honeycomb fired body constituting the honeycomb filter shown in FIG. 1. FIG. 2B is an A-A line cross-sectional view of the honeycomb fired body shown in FIG. 2A.

Figure 3:
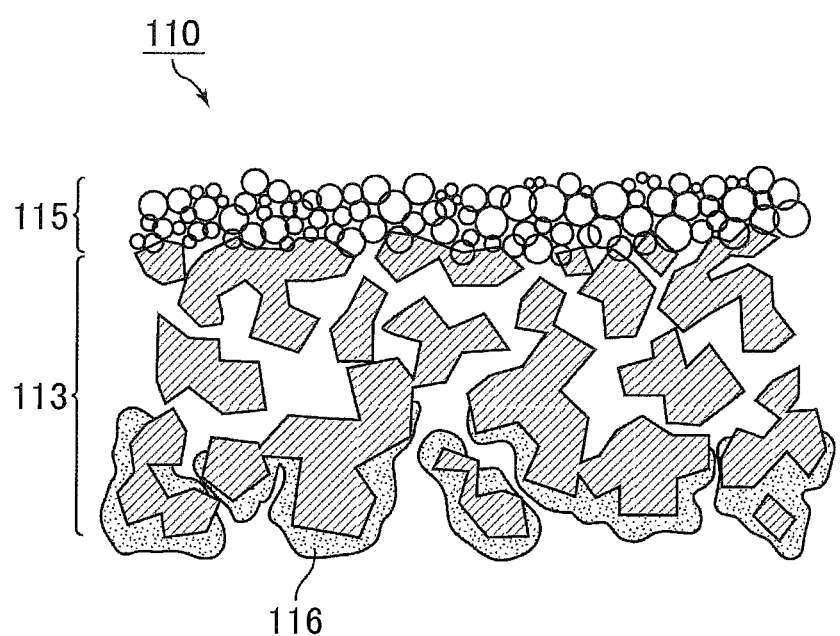
FIG. 3 is a partial enlarged sectional view of the cell wall of the honeycomb fired body shown in FIG. 2A and FIG. 2B.

FIG. 3 is a partial enlarged sectional view of the cell wall of the honeycomb fired body shown in FIG. 2A and FIG. 2B.

In the honeycomb filter 100 in FIG. 1, a plurality of honeycomb fired bodies 110 are bonded together via adhesive layers 101 to constitute a ceramic honeycomb substrate (ceramic block) 103, and a peripheral coating layer 102 for preventing leakage of exhaust gases is formed on the periphery of the ceramic honeycomb substrate (ceramic block) 103. The peripheral coating layer may be formed as needed.

The honeycomb filter formed by bonding the plurality of honeycomb fired bodies together is also referred to as an aggregated honeycomb filter.

The honeycomb fired bodies 110 constituting the honeycomb filter 100 will be described later, and are preferably porous bodies made of silicon carbide or silicon-containing silicon carbide.

In the honeycomb fired body 110 shown in FIG. 2A and FIG. 2B, a large number of cells 111a and 111b are separated by cell walls 113, and placed in parallel in the longitudinal direction (direction of an arrow a in FIG. 2A), and a peripheral wall 114 is formed around the periphery of the honeycomb fired body. One end of each of the cells 111a and 111b is sealed with a sealing material 112a or 112b.

As shown in FIG. 2B and FIG. 3, an auxiliary filter layer 115 is formed on the surface of the cell wall 113 in the honeycomb fired body 110.

As shown in FIG. 3, an SCR catalyst 116 is supported on the cell wall 113 in the honeycomb fired body 110.

In the honeycomb fired body 110 shown in FIG. 2A, the auxiliary filter layer 115 and the SCR catalyst 116 are not shown. In the honeycomb fired body 110 shown in FIG. 2B, the SCR catalyst 116 is not shown.

In the honeycomb fired body 110 shown in FIG. 2A and FIG. 2B, the large volume cells 111a each having a larger cross-sectional area perpendicular to the longitudinal direction than the small volume cells 111b, and the small volume cells 111b having a smaller cross-sectional area perpendicular to the longitudinal direction than the large volume cells 111a are alternately disposed.

The cross section of the large volume cell 111a perpendicular to the longitudinal direction has a substantially octagonal shape, and the cross section of the small volume cell 111b perpendicular to the longitudinal direction has a substantially quadrangular shape.

In the honeycomb fired body 110 shown in FIG. 2A and FIG. 2B, the large volume cell 111a is opened at an end on a first end face 117a side of the honeycomb fired body 110, and is sealed with the sealing material 112a at an end of a second end face 117b of the honeycomb fired body 110. On the other hand, the small volume cell 111b is open at an end of the second end face 117b side of the honeycomb fired body 110, and is sealed with the sealing material 112b on the first end face 117a side of the honeycomb fired body 110.

Accordingly, as shown in FIG. 2B, exhaust gases $G_1$ (in FIG. 2B, $G_1$ indicate exhaust gases and arrows indicate the flowing direction of the exhaust gases) flows into the large volume cell 111a surely passes through the cell wall 113 interposed between the large volume cells 111a and the small volume cell 111b and then, flows out from the small volume cells 111b. Because PM in the exhaust gases $G_1$ is collected during passage of the exhaust gases through the cell wall 113, the cell wall 113 interposed between the large volume cell 111a and the small volume cell 111b functions as a filter.

In this manner, gases such as exhaust gases can pass through the large volume cells 111a and the small volume cells 111b of the honeycomb fired body 110. When gases such as exhaust gases pass in the direction shown in FIG. 2B, an end on the first end face 117a side of the honeycomb fired body 110 (an end at which the small volume cells 111b are sealed) is referred to as a fluid inlet end, and an end on the second end face 117b side of the honeycomb fired body 110 (an end at which large volume cells 111a are sealed) is referred to as a fluid outlet end.

That is, the large volume cells 111a opened at the fluid inlet end are cells 111a on the fluid inlet side, and the small volume cells 111b opened at the fluid outlet end are cells 111b on the fluid outlet side.

The auxiliary filter layer will be described below.

The auxiliary filter layer is made of ceramic particles, and preferably spherical ceramic particles.

In the honeycomb filter according to first embodiment of the present invention, the ceramic particles forming the auxiliary filter layer is preferably made of a heat-resistant oxide.

If the auxiliary filter layer is made of the heat-resistant oxide, failures such as melting of the auxiliary filter layer in the regeneration process of burning PM are not caused. Thus, a honeycomb filter having excellent heat resistance can be obtained.

Examples of the heat-resistant oxide include alumina, silica, mullite, ceria, cordierite, zirconia, and titania. These may be used alone or in combination.

Among the heat-resistant oxide, alumina is preferable.

In the honeycomb filter according to the first embodiment of the present invention, the average particle diameter of the particles constituting the auxiliary filter layer is preferably from 0.2 to 1.2 µm, more preferably from 0.2 to 0.9 µm, and still more preferably from 0.5 to 0.8 µm.

When the average particle diameter of the particles constituting the auxiliary filter layer is less than 0.2 µm, the particles constituting the auxiliary filter layer are too small, so that the auxiliary filter layer is hardly formed on the surface of the cell wall. When the average particle diameter of the particles constituting the auxiliary filter layer is less than 0.2 µm, the particles constituting the auxiliary filter layer may enter into (pores of) the cell walls to clog the pores, so that the pressure loss may be increased. On the other hand, when the average particle diameter of the particles constituting the auxiliary filter layer exceeds 1.2 µm, the particles constituting the auxiliary filter layer are too large so that the pore diameter of the auxiliary filter layer becomes large even when the auxiliary filter layer is formed. For this reason, PM passes through the auxiliary filter layer and enters into the pores of the cell wall, which results in the "depth filtration" state in which PM is collected in the cell walls. Accordingly, the pressure loss is increased.

The average particle diameter of the particles constituting the auxiliary filter layer can be measured according to the following method.

The honeycomb fired bodies constituting the honeycomb filter are processed to prepare a sample of 10 mm×10 mm×10 mm.

A surface of any one site of the prepared sample is observed with a scanning electron microscope (SEM). At this time, the particles constituting the auxiliary filter layer are placed within one viewing field. The SEM observation conditions are an accelerating voltage of 15.00 kV, a working distance (WD) of 15.00 mm, and a magnification of 10000 times.

Next, the diameters of all particles within one viewing field are visually measured. An average value of the diameters of all particles measured within one viewing field is defined as "average particle diameter of the particles constituting the auxiliary filter layer".

In the honeycomb filter according to the first embodiment of the present invention, if the average pore diameter of the pores of the auxiliary filter layer is defined as a, a is preferably from 0.5 to 3.0 µm, more preferably from 0.7 to 2.0 µm, and still more preferably from 1.0 to 1.9 µm.

When a is less than 0.5 µm, gas hardly permeates the auxiliary filter layer so that the permeation resistance is large. On the other hand, when a exceeds 3.0 µm, PM easily passes through the auxiliary filter layer so that a sufficient PM collecting efficiency is hardly obtained.

The average pore diameter a of the pores of the auxiliary filter layer can be measured according to the following method.

First, in the same manner as in measuring the average particle diameter of the particles constituting the auxiliary filter layer, the honeycomb fired bodies constituting the honeycomb filter are processed to prepare a sample of 10 mm×10 mm×10 mm.

A surface of any one site of the prepared sample is observed with a scanning electron microscope (SEM). At this time, the SEM observation conditions are an accelerating voltage of 15.00 kV, a working distance (WD) of 15.00 mm, and a magnification of 10000 times.

The obtained SEM photograph is binarized, and the diameter of a circle inscribed in a gap between particles is measured at 10 points or more. An average value of the measured diameters of the inscribed circle is defined as "the average pore diameter a of the pores of the auxiliary filter layer".

In the honeycomb filter according to the first embodiment of the present invention, the auxiliary filter layer may include hollow particles.

In the honeycomb filter according to the first embodiment of the present invention, the thickness of the auxiliary filter layer is preferably from 3 to 60 μm, more preferably from 5 to 40 μm, and still more preferably from 10 to 25 μm.

When the thickness of the auxiliary filter layer is less than 3 μm, the auxiliary filter layer is too thin so that PM is hardly collected. On the other hand, when the thickness of the auxiliary filter layer exceeds 60 μm, the auxiliary filter layer is too thick so that the pressure loss tends to increase.

In the honeycomb filter according to the first embodiment of the present invention, the thickness of the auxiliary filter layer is preferably uniform.

The thickness of the auxiliary filter layer can be measured according to the following method.

Figure 4:
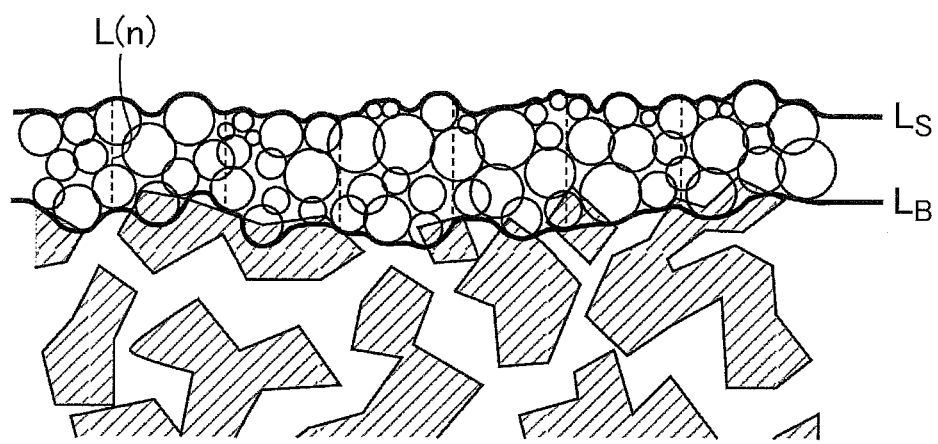
FIG. 4 is a schematic view for describing a method for measuring the thickness of the auxiliary filter layer.

FIG. 4 is a schematic view for describing a method for measuring the thickness of the auxiliary filter layer.

First, in the same manner as in measuring the average particle diameter of the particles constituting the auxiliary filter layer, the honeycomb fired bodies constituting the honeycomb filter are processed to prepare a sample of 10 mm×10 mm×10 mm.

A cross section of a cell in any one part of the prepared sample is observed with a scanning electron microscope (SEM). The SEM observation conditions are an accelerating voltage of 15.00 kV, a working distance (WD) of 15.00 mm, and a magnification of from 500 to 1000 times.

For easy understanding, FIG. 4 shows a schematic view in place of an actual SEM photograph.

Next, as shown in FIG. 4, a line is drawn along lower faces of the particles constituting the auxiliary filter layer, and is defined as a lower face $L_B$. A line is drawn along upper faces of the particles constituting the auxiliary filter layer, and is defined as an upper face $L_S$.

Subsequently, the sample is divided into 50 parts in the horizontal direction of the SEM photograph (longitudinal direction of the honeycomb fired body). The distance between the upper face $L_S$ and the lower face $L_B$ is measured in the divided 50 parts, and a thickness of the auxiliary filter layer in the $n^{th}$ part (n is an integer of 1 to 50) is defined as L(n). An average value of L(1) to L (50) is defined as "the thickness of the auxiliary filter layer".

In the honeycomb filter according to the first embodiment of the present invention, the auxiliary filter layer is formed on the surface of the cell wall of only the cell opened at the fluid inlet end and sealed at the fluid outlet end.

Because exhaust gases flow into cells from the fluid inlet side of the honeycomb filter, more PM in the exhaust gases is deposited on the cell wall of the cell opened at the fluid inlet end and sealed at the fluid outlet end. Accordingly, when the auxiliary filter layer is formed on the surface of the cell wall of only the cell opened at the fluid inlet end and sealed at the fluid outlet end, the auxiliary filter layer can collect PM, preventing depth filtration.

In the honeycomb filter according to the first embodiment of the present invention, although the auxiliary filter layer is formed on the entire surface of the cell wall of the cell opened at the fluid inlet end and sealed at the fluid outlet end, the auxiliary filter layer may be formed on a part of the surface of the cell wall.

The SCR catalyst will be described below.

The SCR catalyst is also called a selective reduction-type NOx catalyst, and reduces and converts NOx in exhaust gases by using ammonia. The SCR catalyst also functions to absorb urea and ammonia.

In the honeycomb filter according to the first embodiment of the present invention, the SCR catalyst is preferably zeolite.

In the honeycomb filter according to the first embodiment of the present invention, the amount of the supported SCR catalyst is preferably from 80 to 200 g/L, more preferably from 100 to 200 g/L, and still more preferably from 100 to 150 g/L.

When the amount of the supported SCR catalyst is from 80 to 200 g/L, NOx in exhaust gases can be sufficiently converted in the case of using the honeycomb filter in the urea SCR device.

When the amount of the supported SCR catalyst is less than 80 g/L, the NOx conversion performance of the honeycomb filter for the urea SCR device is not sufficient. On the other hand, when the amount of the supported SCR catalyst exceeds 200 g/L, the cells are clogged with the SCR catalyst, and the pressure loss tends to increase even in the non-deposition state of PM.

In this specification, the amount of the supported SCR catalyst is the weight of the SCR catalyst per apparent volume of 1 liter of the honeycomb filter.

The apparent volume of the honeycomb filter includes the volume of the adhesive layer and/or the peripheral coating layer.

In the honeycomb filter according to the first embodiment of the present invention, if the average particle diameter of the particles constituting the SCR catalyst is defined as b, b is preferably from 0.7 to 5.0 μm, more preferably from 2.0 to 4.0 μm, and still more preferably from 2.1 to 4.0 μm.

When b is less than 0.7 μm, the particles constituting the SCR catalyst are too small so that the auxiliary filter layer is easily clogged with the particles. On the other hand, when b exceeds 5.0 μm, the auxiliary filter layer is hardly clogged with the particles constituting the SCR catalyst, but the specific surface area of the particles becomes small so that a sufficient NOx conversion rate is hardly obtained.

The average particle diameter b of the particles constituting the SCR catalyst can be measured in the same manner as in measuring the average particle diameter of the particles constituting the auxiliary filter layer. In the case of measuring the average particle diameter b, SEM observation may be performed so as to place the particles constituting the SCR catalyst within one viewing field.

An average particle diameter of the particles constituting the SCR catalyst that is not supported on the ceramic honeycomb substrate (for example, zeolite particles contained in a below-mentioned zeolite slurry) may be used in place of the average particle diameter b.

In the honeycomb filter according to the first embodiment of the present invention, the SCR catalyst is supported on the surface of the cell wall of the cell sealed at the fluid inlet end and opened at the fluid outlet end, in the cell wall on which the auxiliary filter layer is formed.

In the honeycomb filter according to the first embodiment of the present invention, although the SCR catalyst is preferably supported on the entire surface of the cell wall of the cell sealed at the fluid inlet end and opened at the fluid outlet end, the SCR catalyst may be supported on a part of the surface of the cell wall.

In the honeycomb filter according to the first embodiment of the present invention, the SCR catalyst may be also supported on pores of the cell wall of the ceramic honeycomb substrate.

In the honeycomb filter according to the first embodiment of the present invention, the SCR catalyst may be further supported on the surface of the cell wall of the cell opened at the fluid inlet end and sealed at the fluid outlet end.

Preferably, more SCR catalyst is supported on the surface of the cell wall of the cell sealed at the fluid inlet end and opened at the fluid outlet end than the surface of the cell wall of the cell opened at the fluid inlet end and sealed at the fluid outlet end.

In this case, contact between collected PM and the SCR catalyst can be prevented.

In the honeycomb filter according to the first embodiment of the present invention, preferably, the SCR catalyst is not supported on the surface of the auxiliary filter layer.

In this case, in the regeneration process of burning PM, deterioration of the SCR catalyst due to heat can be suppressed.

In the honeycomb filter according to the first embodiment of the present invention, the honeycomb filter includes a portion that satisfies a<b, given that an average pore diameter of pores of the auxiliary filter layer is a (w), and an average particle diameter of particles constituting the SCR catalyst is b (m).

In the honeycomb filter according to the first embodiment of the present invention, the entire honeycomb filter need not satisfy a<b, and a part of the honeycomb filter only needs to satisfy a<b.

Specifically, the portion that satisfies a<b may be 60% or less of the entire honeycomb filter, or may be 40% or less of the entire honeycomb filter. The portion that satisfies a<b is preferably 20% or more of the entire honeycomb filter, and more preferably 30% or more of the entire honeycomb filter.

By setting the portion that satisfies a<b to be 40% or less of the entire honeycomb filter, clogging of the auxiliary filter layer with the SCR catalyst can be prevented. This, in turn, suppresses the increase in the pressure loss.

In the honeycomb filter according to the first embodiment of the present invention, the porosity of the cell walls is preferably from 55 to 70%.

When the porosity of the cell walls of the ceramic honeycomb substrate is from 55 to 70%, a large amount of the SCR catalyst can be supported on the cell walls.

When the porosity of the cell walls is less than 55%, the pores of the cell walls are clogged with the SCR catalyst in the case where a large amount of the SCR catalyst is supported on the ceramic honeycomb substrate, so that exhaust gases hardly passes through the cell walls. Accordingly, the exhaust gases hardly diffuse, and the effect of the SCR catalyst is hardly to be sufficiently exerted. On the other hand, when the porosity of the cell walls exceeds 70%, the strength of the ceramic honeycomb substrate tends to decrease.

In the honeycomb filter according to the first embodiment of the present invention, the average pore diameter of the cell wall is preferably from 15 to 30 μm.

When the average pore diameter of the cell wall is less than 15 μm, the pressure loss after the SCR catalyst is supported on the cell walls tends to increase. On the other hand, when the average pore diameter of the cell wall exceeds 30 μm, it is difficult to form the auxiliary filter layer on the surface of the cell wall.

The porosity and the pore diameter can be measured by using a conventionally known mercury porosimetry.

In the honeycomb filter according to the first embodiment of the present invention, the thickness of the cell wall is preferably from 0.12 to 0.40 mm, and more preferably from 0.20 to 0.30 mm.

When the thickness of the cell wall is less than 0.12 mm, the thickness of the cell wall becomes thin so that the strength of the honeycomb fired bodies can not be maintained. On the other hand, when the thickness of the cell wall exceeds 0.40 mm, the pressure loss of the honeycomb structure tends to increase.

The thickness of the cell wall refers to a thickness between adjacent cells.

In the honeycomb filter according to the first embodiment of the present invention, the cell density of the cross section perpendicular to the longitudinal direction of the honeycomb fired body is not limited, but a preferable lower limit is 31.0 pcs/cm$^2$ (200 pcs/inch$^2$), a preferable upper limit is 93.0 pcs/cm$^2$ (600 pcs/inch$^2$), a more preferable lower limit is 38.8 pcs/cm$^2$ (250 pcs/inch$^2$), and a more preferable upper limit is 77.5 pcs/cm$^2$ (500 pcs/inch$^2$).

In the honeycomb filter according to the first embodiment of the present invention, the cross sections of the large volume cells and the small volume cells in the honeycomb fired bodies perpendicular to the longitudinal direction may take following shapes.

Figure 5A:
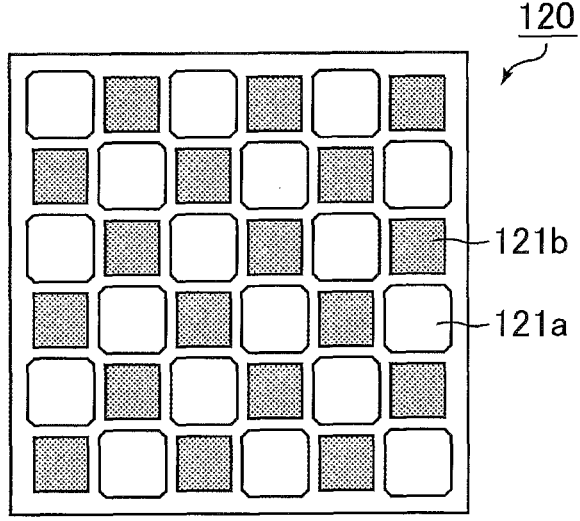
FIG. 5A, FIG. 5B, and FIG. 5C are side views schematically showing examples of the cell structure of the honeycomb fired body constituting the honeycomb filter according to the first embodiment of the present invention.
Figure 5B:
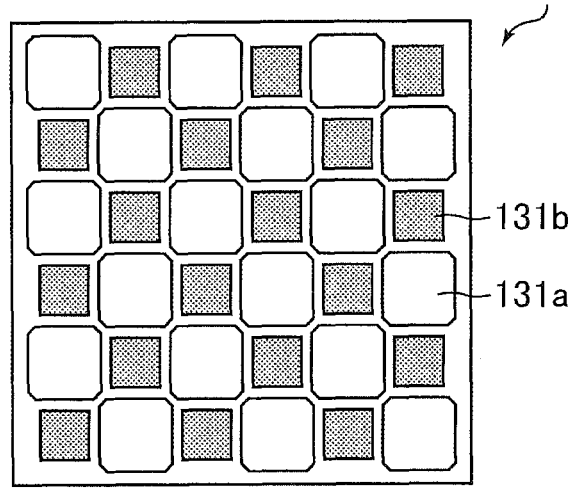
Figure 5C:
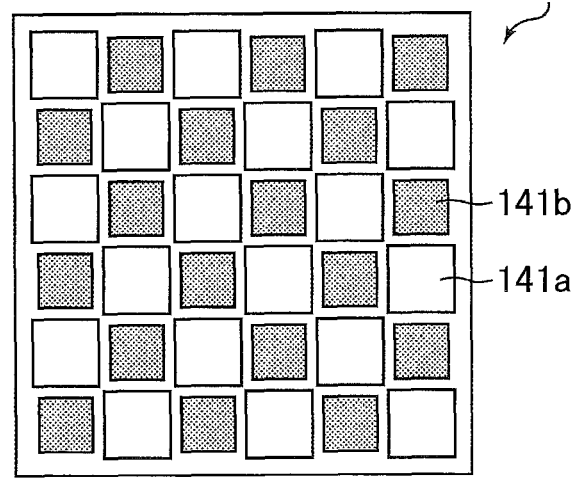

FIG. 5A, FIG. 5B, and FIG. 5C are side views schematically showing examples of the cell structure of the honeycomb fired body constituting the honeycomb filter according to the first embodiment of the present invention.

FIG. 5A, FIG. 5B, and FIG. 5C do not show the auxiliary filter layer.

In a honeycomb fired body 120 shown in FIG. 5A, cross sections of large volume cells 121a perpendicular to the longitudinal direction each have a substantially octagonal shape, cross sections of small volume cells 121b perpendicular to the longitudinal direction each have a substantially quadrangular shape, and the large volume cells 121a and the small volume cells 121b are alternately disposed. Similarly, in a honeycomb fired body 130 shown in FIG. 5B, cross sections of large volume cells 131a perpendicular to the longitudinal direction each have a substantially octagonal shape, cross sections of small volume cells 131b perpendicular to the longitudinal direction each have a substantially quadrangular shape, and the large volume cells 131a and the small volume cells 131b are alternately disposed. The honeycomb fired body 120 shown in FIG. 5A is different from the honeycomb fired body 130 shown in FIG. 5B in an area ratio of the cross sectional area of the large volume cell perpendicular to the longitudinal direction relative to the cross sectional area of the small volume cell perpendicular to the longitudinal direction (the cross sectional area of the large volume cell perpendicular to the longitudinal direction/ the cross sectional area of the small volume cell perpendicular to the longitudinal direction).

In a honeycomb fired body 140 shown in FIG. 5C, cross sections of large volume cells 141a perpendicular to the longitudinal direction each have a substantially quadrangular shape, cross sections of small volume cells 141b perpendicular to the longitudinal direction each have a substantially quadrangular shape, and the large volume cells 141a and the small volume cells 141b are alternately disposed.

In the honeycomb filter according to the first embodiment of the present invention, the area ratio of the cross sectional area of the large volume cell perpendicular to the longitudinal direction relative to the cross sectional area of the small volume cell perpendicular to the longitudinal direction (the cross sectional area of the large volume cell perpendicular to the longitudinal direction/the cross sectional area of the small volume cell perpendicular to the longitudinal direction) is preferably from 1.4 to 2.8, more preferably from 1.5 to 2.4.

By setting the cells on the fluid inlet side to the large volume cells and the cells on the fluid outlet side to the small volume cells, more PM can be deposited on the cells on the fluid inlet side (large volume cells). However, when the area ratio is less than 1.4, since the difference between the cross sectional area of the large volume cell and the cross sectional area of the small volume cell is small, the effect of the large volume cells and the small volume cells cannot be obtained so much. On the other hand, when the area ratio exceeds 2.8, the cross sectional area of the small volume cell perpendicular to the longitudinal direction becomes so small that the pressure loss due to friction caused when gases such as exhaust gases pass through the cells on the fluid outlet side (small volume cells) increases.

Next, a production method for a honeycomb filter according to the first embodiment of the present invention will be described.

The production method for the honeycomb filter according to the first embodiment of the present invention includes:

a honeycomb fired body production step of producing a porous honeycomb fired body by using a ceramic powder, the porous honeycomb fired body having a large number of cells placed longitudinally in parallel with one another with a cell wall interposed therebetween, each of the cells being sealed at either a fluid inlet end or a fluid outlet end of the cell;

an auxiliary filter layer formation step of forming an auxiliary filter layer on a surface of the cell wall; and a catalyst application step of supporting an SCR catalyst on the cell wall; wherein the auxiliary filter layer formation step includes:

a droplet dispersion step of dispersing droplets containing a raw material for ceramic particles in carrier gas; and a carrier gas introducing step of introducing the carrier gas into the cell opened at the fluid inlet end and sealed at the fluid outlet end, and in the catalyst application step, the SCR catalyst is supported on the cell walls by applying the SCR catalyst into the cell sealed at the fluid inlet end and opened at the fluid outlet end.

In the production method for the honeycomb filter according to the first embodiment of the present invention, the ceramic honeycomb substrate including the honeycomb fired bodies is manufactured, and the auxiliary filter layer is formed on the surface of the cell walls of the ceramic honeycomb substrate and then, the SCR catalyst is supported on the cell walls on which the auxiliary filter layer is formed.

The auxiliary filter layer formation step and the catalyst application step will be described below.

In the explanation of this embodiment, the material for the auxiliary filter layer is a heat-resistant oxide.

The step of manufacturing the ceramic honeycomb substrate including the honeycomb fired bodies will be described later.

First, the auxiliary filter layer formation step is described.

FIG. 6 is a sectional view schematically showing an embodiment of a droplet dispersion step and a carrier gas introducing step.

FIG. 6 shows a carrier gas introducing apparatus 1 that introduces carrier gas into cells of the ceramic honeycomb substrate.

The carrier gas introducing apparatus 1 includes a droplet dispersion section 20 for dispersing droplets in the carrier gas, a pipe section 30 through which the carrier gas in which the droplets are dispersed passes, and an introducing section 40 for introducing the carrier gas into the cells of the ceramic honeycomb substrate.

An example of a droplet dispersion step and a carrier gas introducing step using the carrier gas introducing apparatus 1 will be described below.

In the carrier gas introducing apparatus 1, carrier gas F flows from the bottom toward the top in FIG. 6. In the carrier gas introducing apparatus 1, the carrier gas F is provided from below the carrier gas introducing apparatus 1 and is discharged above the introducing section 40 through the droplet dispersion section 20, the pipe section 30, and the introducing section 40.

The carrier gas F is pressurized from the bottom toward the top in FIG. 6 by a pressure difference caused by a pressure applied from below the carrier gas introducing apparatus or suction applied from above the carrier gas introducing apparatus, and flows upward in the carrier gas introducing apparatus 1.

Gas that does not react at a temperature up to 800° C. and does not react with components in the droplets dispersed in the carrier gas is used as the carrier gas.

Examples of the carrier gas include air, nitrogen gas, and argon gas.

In the droplet dispersion section 20 of the carrier gas introducing apparatus 1, an oxide-containing solution filled in a tank, which is not shown in the Figure, is sprayed to form of droplets 11, and the droplets 11 are dispersed in carrier gas F.

The oxide-containing solution is a concept including a solution containing a heat-resistant oxide precursor from which the heat-resistant oxide is formed by heating, and a slurry containing heat-resistant oxide particles.

The heat-resistant oxide precursor means a compound from which the heat-resistant oxide is derived by heating.

Examples of the heat-resistant oxide precursor include hydroxide, carbonate, nitrate, and hydrate of a metal constituting the heat-resistant oxide.

Examples of the heat-resistant oxide precursor in the case where the heat-resistant oxide is alumina, that is, an alumina precursor include aluminum nitrate, aluminum hydroxide, boehmite, and diaspore.

The slurry containing heat-resistant oxide particles is a solution in which heat-resistant oxide particles are suspended in water.

The droplets 11 dispersed in the carrier gas F flow upward in the carrier gas introducing apparatus 1 with the carrier gas F, and pass through the pipe section 30.

The pipe section 30 of the carrier gas introducing apparatus 1 is a pipe through which the carrier gas F, in which the droplets 11 are dispersed, passes.

A path 32 of the pipe section 30, through which the carrier gas F passes, is a space surrounded with a pipe wall 31 of the pipe.

In the carrier gas introducing apparatus 1 in this embodiment, the pipe section 30 is provided with a heating mechanism 33.

Examples of the heating mechanism 33 include an electric heater.

In this embodiment, the pipe wall 31 of the pipe is heated using the heating mechanism 33 and the carrier gas F in which the droplets 11 are dispersed passes through the pipe. Then, the carrier gas F passing through the pipe section 30 is preferably heated, thereby heating the droplets 11 dispersed in the carrier gas F.

When the droplets 11 are heated, a liquid component in the droplets evaporates to form spherical ceramic particles 12. In FIG. 6, the spherical ceramic particles 12 are represented by white circles.

When the droplets include the heat-resistant oxide precursor, the heat-resistant oxide precursor becomes the heat-resistant oxide (spherical ceramic particles) by heating the carrier gas.

In this embodiment, preferably, the pipe wall 31 of the pipe is heated to 100 to 800° C. using 33, and the carrier gas F in which the droplets 11 are dispersed is passed through the pipe for 0.1 to 3.0 seconds.

When the temperature of the heated pipe is lower than 100° C., and time during which the carrier gas passes through the pipe is less than 0.1 second, it is hard to evaporate moisture in the droplets. On the other hand, when the temperature of the heated pipe exceeds 800° C., and time during which the carrier gas passes through the pipe exceeds 3.0 seconds, energy necessary for producing the honeycomb filter becomes too large, decreasing the production efficiency of the honeycomb filter.

In this embodiment, a length of the pipe is not limited, but is preferably from 500 to 3000 mm.

When the length of the pipe is less than 500 mm, even if the speed at which the carrier gas passes through the pipe is delayed, it is hard to evaporate moisture in the droplets. On the other hand, when the length of the pipe exceeds 3000 mm, an apparatus for producing the honeycomb filter becomes too large, decreasing the production efficiency of the honeycomb filter.

The spherical ceramic particles 12 flows upward in the carrier gas introducing apparatus 1 with the carrier gas F while being dispersed in the carrier gas F, and then flows into cells of a ceramic honeycomb substrate 103 in the introducing section 40.

In this embodiment, a ceramic block formed by bonding a plurality of honeycomb fired bodies together via an adhesive layer is used as the ceramic honeycomb substrate.

The ceramic honeycomb substrate 103 is disposed in the upper portion of the carrier gas introducing apparatus 1 so as to close an outlet of the carrier gas introducing apparatus 1.

Thus, the carrier gas F surely flows into the ceramic honeycomb substrate 103.

FIG. 6 schematically shows the cross section of the honeycomb fired body constituting the ceramic block (the cross section shown in FIG. 2B) as the cross section of the ceramic honeycomb substrate 103.

In the ceramic honeycomb substrate 103, ends of the cells 111a on the fluid inlet side are opened, and ends of the cells 111b on the fluid outlet side are sealed.

Thus, the carrier gas F flows into the ceramic honeycomb substrate 103 from openings of the cells 111a on the fluid inlet side.

When the carrier gas F, in which the spherical ceramic particles 12 are dispersed, flows into the cells 111a on the fluid inlet side of the ceramic honeycomb substrate 103, the spherical ceramic particles 12 are deposited on the surface of the cell wall 113 of the ceramic honeycomb substrate 103.

In this embodiment, preferably, the ceramic honeycomb substrate 103 is heated to 100 to 800° C., and the carrier gas F is introduced to the heated cell.

When the ceramic honeycomb substrate 103 is heated to 100 to 800° C., even if any liquid component remains in the spherical ceramic particles 12, the liquid component evaporates, and dried spherical ceramic particles in powder form are deposited on the surface of the cell wall.

The carrier gas F flows into the ceramic honeycomb substrate 103 through the openings of the cells 111a on the fluid inlet side, passes the cell walls 113 of the ceramic honeycomb substrate 103, and flows out of the openings of the cells 111b of the fluid outlet side.

The carrier gas introducing step is performed by using such procedure.

In the carrier gas introducing step, the spherical ceramic particles can be deposited on the surface of the cell wall.

Subsequently, the step of heating the ceramic honeycomb substrate is preferably performed.

Preferably, the ceramic honeycomb substrate in which the spherical ceramic particles are adhered to the cell walls in the carrier gas introducing step is heated under a temperatures of 900 to 1500° C. by use of a furnace.

A desirable heating atmosphere is an air atmosphere, nitrogen atmosphere, or argon atmosphere.

Then, the spherical ceramic particles adhered to the surface of the cell wall are thermally contracted by heat sintering, and are strongly fixed to the surface of the cell wall.

Through the above-mentioned steps, the auxiliary filter layer can be formed on the surface of the cell walls.

All of the step of heating the carrier gas (drying step), the step of introducing the carrier gas while heating the ceramic honeycomb substrate, and the step of introducing the carrier gas and then heating the ceramic honeycomb substrate (heating step) are not necessarily performed, and at least one of them may be performed.

Preferably, the drying step and the heating step among the steps are performed.

Next, the catalyst application step will be described.

In the catalyst application step, the SCR catalyst is supported on the cell wall by applying the SCR catalyst into the cell sealed at the fluid inlet end and opened at the fluid outlet end.

To support the SCR catalyst on the cell wall, for example, the ceramic honeycomb substrate is immersed in a slurry containing the SCR catalyst and then, pulling out and heating the ceramic honeycomb substrate.

The amount of the supported SCR catalyst can be adjusted by repeating the step of immersing the ceramic honeycomb substrate in the slurry and heating the ceramic honeycomb substrate, or changing the concentration of the slurry.

The average particle diameter b of particles constituting the SCR catalyst can be adjusted by controlling the size of particles constituting the SCR catalyst in the slurry. That is, the size of the particles constituting the SCR catalyst in the slurry may be adjusted such that predefined average pore diameter a of pores of the auxiliary filter layer is larger than the average particle diameter b of particles constituting the SCR catalyst.

To support the SCR catalyst only on the cell wall of the cell on the fluid outlet side (small volume cell), for example, only the cell on the fluid inlet side (large volume cell) of the ceramic honeycomb substrate is sealed also on the other end with a material that disappears during the heating following the pulling-out (for example, plastic material), and then the ceramic honeycomb substrate is immersed in the slurry containing the SCR catalyst.

To differentiate between the amount of the catalyst on the cell wall of the cell on the fluid inlet side (large volume cell) and the amount of the catalyst on the cell wall of the cell on the fluid outlet side (small volume cell), for example, the catalyst may be adhered to the cell wall of one cell in the same manner as in supporting the SCR catalyst only on the cell wall of the cell on the fluid inlet side and then, the SCR catalyst also may be adhered to the other cell. At this time, time for immersing the ceramic honeycomb substrate in the slurry containing the SCR catalyst, or the concentration of the slurry may be changed. Alternatively, the size of the catalyst in the slurry may be increased and the slurry may be introduced to the cell on the fluid inlet side, or the concentration of the slurry may be changed after adhesion by air-blowing.

A process of manufacturing the ceramic honeycomb substrate including the honeycomb fired bodies in the production method for a honeycomb filter according to the first embodiment of the present invention will be described below.

The ceramic honeycomb substrate to be manufactured as follows is a ceramic block formed by bonding the honeycomb fired bodies together via an adhesive layer.

The case of using a silicon carbide as ceramic powder will be described.

(1) A molding step for manufacturing a honeycomb molded body is performed by extruding a wet mixture containing the ceramic powder and a binder.

Specifically, first, silicon carbide powder having a different average particle diameter as the ceramic powder, an organic binder, liquid plasticizer, a lubricant, and water are mixed to prepare a wet mixture for producing the honeycomb molded body.

Subsequently, the wet mixture is extruded with an extruder to manufacture a honeycomb molded body of a predetermined shape.

At this time, the honeycomb molded body is manufactured using a die for the cross-sectional shape of the cell structure (cell shape and cell arrangement) as shown in FIG. 2A and FIG. 2B.

(2) The honeycomb molded body is cut to have a predetermined length, and the cut honeycomb molded body is dried with a microwave drier, hot air drier, dielectric drier, decompression drier, vacuum drier, or freeze drier, and a sealing material paste for a sealing material is filled in the predetermined cell to seal the cell.

The wet mixture may be used as the sealing material paste.

(3) A degreasing step is performed by heating the honeycomb molded body in a degreasing furnace to remove organic substances in the honeycomb molded body and then, the degreased honeycomb molded body is conveyed to a firing furnace to perform a firing step, thereby manufacturing the honeycomb fired body as shown in FIG. 2A and FIG. 2B.

The sealing material paste filled in the end of the cell is fired by heating to become the sealing material.

Conditions of the cutting step, the drying step, the sealing step, the degreasing step, and the firing step may be conditions used in the conventional method of manufacturing the honeycomb fired body.

(4) A bonding step is performed by sequentially stacking a plurality of honeycomb fired bodies on a support table and bonding the honeycomb fired bodies together with an adhesive paste to manufacture a honeycomb aggregated body formed of the plurality of stacked honeycomb fired bodies.

Examples of the adhesive paste include an inorganic binder, an organic binder, and inorganic particles. The adhesive paste further includes inorganic fibers and/or whisker.

(5) The honeycomb aggregated body is heated to heat and solidify the adhesive paste, to form an adhesive layer, and a quadrangular pillar-shaped ceramic block is manufactured using the adhesive layer.

Conditions for heating and solidifying the adhesive paste may be conditions used in the conventional method of manufacturing the honeycomb filter.

(6) A cutting step is performed by cutting the ceramic block.

Specifically, the outer periphery of the ceramic block is cut with a diamond cutter to manufacture a ceramic block having a substantially round pillar-shaped.

(7) A peripheral coating layer formation step is performed by applying a peripheral coating material paste to the outer peripheral face of the substantially round pillar-shaped ceramic block, and drying and solidifying the peripheral coating material paste to form a peripheral coating layer.

The adhesive paste may be used as the peripheral coating material paste. A paste that is different from the adhesive paste in composition may be used as the peripheral coating material paste.

The peripheral coating layer is not necessarily provided, and may be provided as needed.

The shape of the outer periphery of the ceramic block is adjusted by providing the peripheral coating layer to form the round pillar-shaped ceramic honeycomb substrate.

Through the above-mentioned steps, the ceramic honeycomb substrate including the honeycomb fired bodies can be manufactured.

Then, the above-mentioned auxiliary filter layer formation step and catalyst application step can be applied to the ceramic honeycomb substrate to produce the honeycomb filter according to the first embodiment of the present invention.

Effects of the honeycomb filter and the production method for the honeycomb filter according to the first embodiment of the present invention will be described below.

(1) In the honeycomb filter in this embodiment, the auxiliary filter layer is formed on the surface of the cell wall of the cell opened at the fluid inlet end and sealed at the fluid outlet end in the ceramic honeycomb substrate. PM in the exhaust gases is collected by the auxiliary filter layer.

On the other hand, the SCR catalyst is supported on the surface of the cell wall of the cell sealed at the fluid inlet end and opened at the fluid outlet end, in the cell wall on which the auxiliary filter layer is formed.

Accordingly, contact between the collected PM and the SCR catalyst is prevented and thus, in regeneration process of burning PM, deterioration of the SCR catalyst due to heat can be suppressed. This ensures the NOx conversion capability for a long time.

(2) In the honeycomb filter in this embodiment, the honeycomb filter includes a portion that satisfies a<b, given that an average pore diameter of pores of the auxiliary filter layer is a (μm), and an average particle diameter of particles constituting the SCR catalyst is b (μm).

When the average pore diameter a of pores of the auxiliary filter layer is smaller than the average particle diameter b of particles constituting the SCR catalyst, the auxiliary filter layer is hardly clogged with the SCR catalyst. This can suppress an increase in the pressure loss.

(3) According to the production method for a honeycomb filter in this embodiment, in the carrier gas introducing step, the carrier gas containing ceramic particles formed in a below-mentioned drying step and so on is introduced to the cell from the fluid inlet end. As a result, the ceramic particles are deposited on the surface of the cell wall of the cell opened at the fluid inlet end and sealed at the fluid outlet end, to form the auxiliary filter layer.

On the other hand, in the catalyst application step, the SCR catalyst is applied into the cell from the fluid outlet side, that is, the opposite side to the side from which the carrier gas is introduced in the carrier gas introducing step.

In other words, the direction in which the carrier gas is introduced in the carrier gas introducing step is opposite to the direction in which the SCR catalyst is applied in the catalyst application step. The SCR catalyst is supported on only the cell wall out of the cell wall and the auxiliary filter layer, or is supported on both the cell wall and the auxiliary filter layer, and the amount per unit volume of the SCR catalyst supported on the cell wall is larger than that of the SCR catalyst supported on the auxiliary filter layer.

Therefore, the amount of the SCR catalyst further from collected PM can be made relatively large. That is, the amount of the SCR catalyst that does not deteriorate due to heat in the regeneration process of burning PM can be made large, ensuring the NOx conversion capability for a long time.

(4) In the production method for a honeycomb filter in this embodiment, the produced honeycomb filter includes a portion that satisfies a<b, given that an average pore diameter of pores of the auxiliary filter layer is a (μm), and an average particle diameter of particles constituting the SCR catalyst is b (μm).

In the catalyst application step, clogging of the auxiliary filter layer with the SCR catalyst can be prevented. As a result, the honeycomb filter having a low pressure loss can be produced.

EXAMPLE

An Example disclosing the honeycomb filter and the production method for a honeycomb filter according to the first embodiment of the present invention will be described below. The present invention is not limited to the Example.

Example 1

Manufacture of Ceramic Honeycomb Substrate

First, 54.6% by weight of coarse silicon carbide powder having an average particle diameter of 22 μm and 23.4% by weight of fine silicon carbide powder having an average particle diameter of 0.5 μm were mixed, and to the resulting mixture were added and kneaded 4.3% by weight of an organic binder (methyl cellulose), 2.6% by weight of a lubricant (UNILUB, produced by NOF CORPORATION), 1.2% by weight of glycerin, and 13.9% by weight of water to obtain a wet mixture. The wet mixture was then subjected to a molding step for extrusion molding.

In this step, a raw honeycomb molded body having the same shape as the honeycomb fired body 110 shown in FIG. 2A with no cells being sealed was manufactured.

Next, the raw honeycomb molded body was dried using a microwave drier to manufacture a dried body of the honeycomb molded body. Then, predetermined cells of the dried body of the honeycomb molded body were filled with a sealing material paste to seal the cells. The wet mixture was used as the sealing material paste. After sealing of the cells, the dried body of the honeycomb molded body filled with the sealing material paste was dried again using the drier.

Subsequently, the dried body of the honeycomb molded body with cells being sealed was degreased at 400° C., and further fired at 2200° C. under normal pressure argon atmosphere for 3 hours.

Accordingly, a honeycomb fired body having a quadrangular pillar shape was manufactured.

The manufactured honeycomb fired body had a height of 34.3 mm, a width of 34.3 mm, a length of 150 mm, an average pore diameter of 24 μm, a porosity of 64%, the number of cells (cell density) of 54.2 pcs/cm$^2$ (350 pcs/inch$^2$), and a thickness of the cell wall of 0.28 mm (11 mil).

By applying an adhesive paste between the honeycomb fired bodies obtained by the above steps to form an adhesive paste layer, and then heating and solidifying the adhesive paste layer to form an adhesive layer, a ceramic block having a substantially quadrangular pillar shape in which 16 pieces of the honeycomb fired bodies were bonded with one another with an adhesive layer interposed therebetween was manufactured.

As the adhesive paste, an adhesive paste containing 30% by weight of alumina fiber having an average fiber length of 20 μm, 21% by weight of silicon carbide particles having an average particle diameter of 0.6 μm, 15% by weight of silica sol, 5.6% by weight of carboxymethyl cellulose, and 28.4% by weight of water was used.

Thereafter, periphery cutting by a diamond cutter was performed on the quadrangular pillar-shaped ceramic block so that a round pillar-shaped ceramic block having a diameter of 142 mm was manufactured.

Next, a peripheral coating material paste was applied on the peripheral face of the round pillar-shaped ceramic block, and the peripheral coating material paste was heated and solidified at 120° C. so that a peripheral coating layer was formed on the peripheral part of the ceramic block.

As the peripheral coating material paste, the same paste as the adhesive paste was used.

Through the above-mentioned steps, a round pillar-shaped ceramic honeycomb substrate having a diameter of 143.8 mm and a length of 150 mm was manufactured.

(Auxiliary Filter Layer Formation Step)

The auxiliary filter layer was formed on the ceramic honeycomb substrate by using a carrier gas introducing apparatus shown in FIG. 6.

As shown in FIG. 6, the ceramic honeycomb substrate was disposed upper portion of the carrier gas introducing apparatus.

At this time, the ceramic honeycomb substrate was disposed with openings of large volume cells as cells on the fluid inlet side being faced to the lower side of the carrier gas introducing apparatus.

As an oxide-containing solution, a solution containing boehmite as a heat-resistant oxide precursor was prepared. The concentration of boehmite was set to 3.8 mol/L (solid content: 20% by weight).

Then, droplets containing boehmite were dispersed in carrier gas by spraying.

A wall of a pipe of the carrier gas introducing apparatus was heated to 200° C., and the carrier gas was introduced toward the upper side of the carrier gas introducing apparatus (ceramic honeycomb substrate side) at a flow rate of 4.6 mm/sec to evaporate moisture in the droplets dispersed in the carrier gas. The moisture in the droplets evaporates during passage of the carrier gas through the pipe, thereby converting the droplets into spherical alumina particles.

The length of the pipe was 1200 mm.

The carrier gas, in which the spherical alumina particles were dispersed, was introduced into cells of the ceramic honeycomb substrate to adhere 5 g/L of spherical alumina particles to surfaces of the cell walls.

Then, the ceramic honeycomb substrate was pulled out of the carrier gas introducing apparatus, and the pulled ceramic honeycomb substrate was heated at 1350° C. in a firing furnace in an air atmosphere for three hours.

Through the steps, the auxiliary filter layer made of alumina particles was formed on the surface of the cell wall.

(Catalyst Application Step)

First, β-type zeolite powder subjected to ion exchange with Fe ions was mixed with a sufficient amount of water, and crushed at 90 min$^{-1}$ with a ball mill so that a zeolite slurry was prepared.

The particle diameter of zeolite was adjusted by changing the particle diameter of the raw material powder and crush time.

The ceramic honeycomb substrate, in which the auxiliary filter layer was formed on the surfaces of the cell walls, was immersed in the zeolite slurry, with openings of small volume cells as cells on the fluid outlet side being faced downward, and was held in this state for one minute.

Subsequently, a drying step of heating the ceramic honeycomb substrate at 110° C. for one hour was performed and then, a firing step of firing the ceramic honeycomb substrate at 700° C. for one hour was performed, and the SCR catalyst was supported thereon.

At this time, the immersion in the zeolite slurry, the drying step, and the firing step were repeated such that the amount of the supported SCR catalyst became 100 g/L.

Through these steps, a honeycomb filter in which the auxiliary filter layer was formed on the surface of the cell wall, and the SCR catalyst (zeolite) was supported on the surface of the cell wall was produced.

Comparative Example 1

A honeycomb filter was produced in the same manner as in Example 1 except that the particle diameter of zeolite was made smaller than that in Example 1 by making the crush time longer than that in Example 1 in the preparation of the zeolite slurry.

The honeycomb filters produced in Example 1 and Comparative Example 1 were evaluated as follows.

(Measurement of Average Pore Diameter a of Pores of Auxiliary Filter Layer and Average Particle Diameter b of Particles Constituting SCR Catalyst)

The average pore diameter a of the pores of the auxiliary filter layer and the average particle diameter b of the particles constituting the SCR catalyst were measured in each of the honeycomb filters according to the above-mentioned method.

As the SEM, FE-SEM S-4800 manufactured by Hitachi Ltd. was used.

Table 1 shows the measurement results.

(Measurement of Collecting Efficiency)

Figure 7:
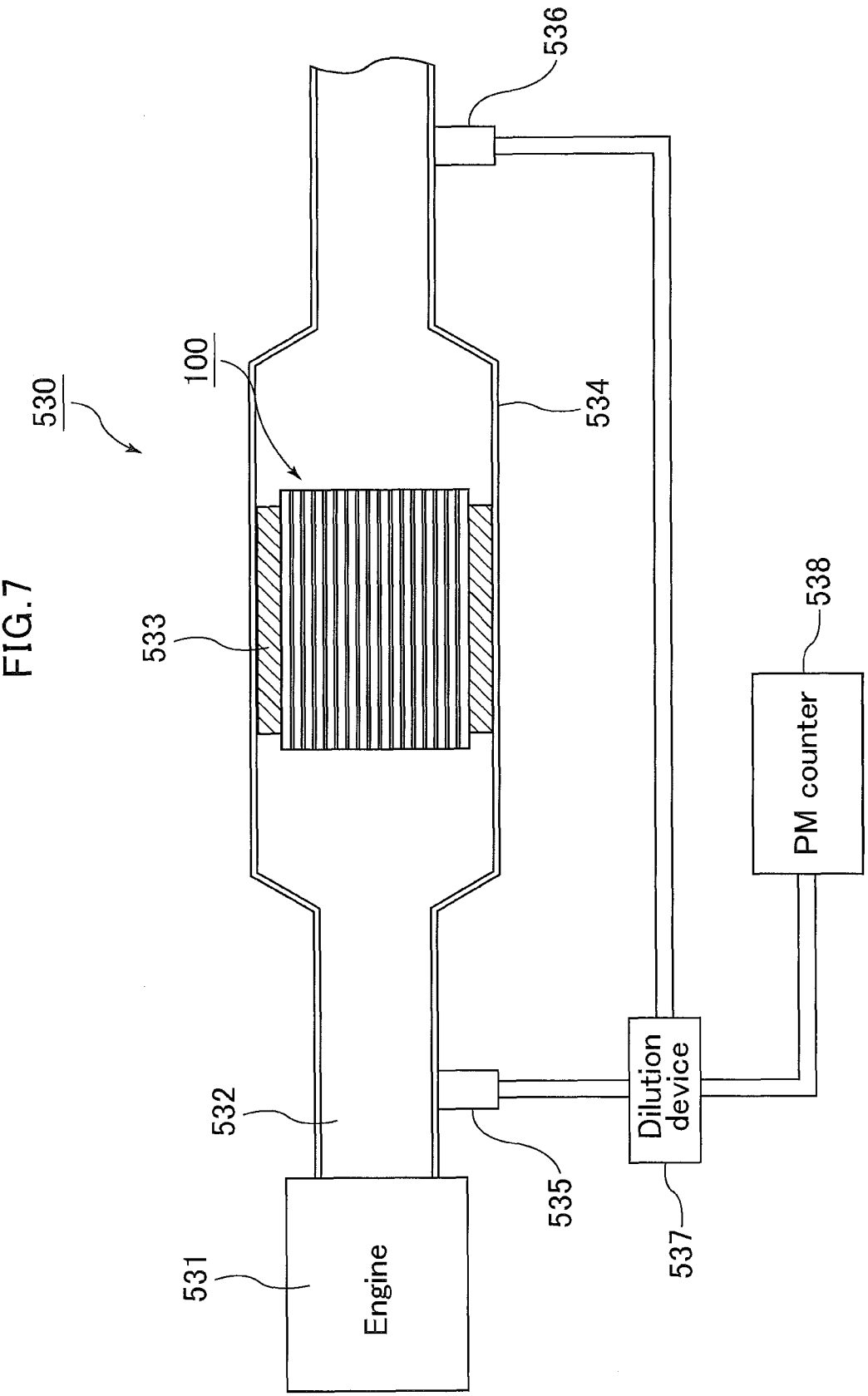
FIG. 7 is a view for describing a collecting efficiency measurement apparatus.

PM collecting efficiency was measured using a collecting efficiency measurement apparatus 530 as shown in FIG. 7. FIG. 7 is a view for describing the collecting efficiency measurement apparatus.

The collecting efficiency measurement apparatus 530 is a scanning mobility particle sizer (SMPS) including a 1.6 L (liter) diesel engine 531, an exhaust gas pipe 532 for passing exhaust gases from the engine 531, a metal casing 534 connected to the exhaust gas pipe 532 to fix a honeycomb filter 100 around which an alumina mat 533 is wound, a sampler 535 for sampling the exhaust gases that has not passed through the honeycomb filter 100, a sampler 536 for sampling the exhaust gases passed through the honeycomb filter 100, a dilution device 537 for diluting the exhaust gases sampled using the samplers 535 and 536, and a PM counter 538 (Agglomerated Particle Counter 3022A-S manufactured by TSI Inc.) for measuring the amount of PM contained in the diluted exhaust gases.

Next, a measurement procedure will be described. The engine 531 was driven with a torque of 50 Nm and a revolving speed of 3000 rpm, and the exhaust gases from the engine 531 was passed through the honeycomb filter 100. At this time, a PM amount $P_0$ before passage through the honeycomb filter 100 and a PM amount $P_1$ after passage through the honeycomb filter 100 were found using the PM counter 538. Then, the collecting efficiency was calculated according to a following equation.

Collecting efficiency(%)=$[(P_0-P_1)/P_0] \times 100$

The collecting efficiency was measured after PM of 0.1 g/liter of the honeycomb filter was collected.

Table 1 shows the measurement results thus obtained.

(Measurement of NOx Conversion Rate)

The NOx conversion rate was measured on each of the honeycomb filters.

In measurement of the NOx conversion rate, each of the honeycomb filters in Example 1 and Comparative Example 1 was cut by a diamond cutter to manufacture a single honeycomb fired body (34.3 mm×34.3 mm×150 mm), and the cut-out honeycomb fired body was further cut to manufacture a round pillar-shaped short-length body of $\phi$1 inch (25.4 mm)×3 inches (76.2 mm). In the manufactured short-length body, one end of each of the cells was sealed, and the short-length body was used as a sample for measuring NOx conversion rate.

The NOx conversion rate was measured by using a NOx conversion rate measurement apparatus (catalyst evaluation apparatus SIGU-2000, manufactured by HORIBA, Ltd.).

The NOx conversion rate measurement apparatus includes a gas generation unit and a reaction unit, and pseudo-exhaust gas generated in the gas generation unit and ammonia was passed through the reaction unit in which the sample for measuring NOx conversion rate was set.

The composition (volume ratio) of the pseudo-exhaust gas includes $NO_2$:350 ppm ($NO_2$/NOx=0.25), $O_2$:14%, $H_2O$: 10%, and $N_2$:balance, and $NH_3$/NOx=1. The composition was achieved by controlling each the amount of the gas flow rate with a flow rate controller.

The temperature of the reaction unit was kept constant at 150° C. As a condition to allow zeolite to contact the pseudo-exhaust gas and ammonia, the space velocity (SV) was set to 70000 $hr^{-1}$.

The NOx concentration $N_0$ before the pseudo-exhaust gas passed through the sample for measuring NOx conversion rate, and the NOx concentration $N_1$ after the pseudo-exhaust gas passed through the sample for measuring NOx conversion rate were measured, and the NOx conversion rate of each honeycomb filter was calculated in accordance with the following equation.

NOx conversion rate(%)=$[(N_0-N_1)/N_0] \times 100$

Table 1 shows the measurement results thus obtained.

(Measurement of Pressure Loss)

The pressure loss was measured by using a pressure loss measurement apparatus 510 as shown in FIG. 8.

FIG. 8 is a view for describing the pressure loss measurement apparatus.

In the pressure loss measurement apparatus 510, the honeycomb filter 100 was fixed to an exhaust gas pipe 512 of a 1.6 L (liter) diesel engine 511 in a metal casing 513, and a pressure gauge 514 was attached thereto so as to detect pressures in front of and in the rear of the honeycomb filter 100.

Then, the engine 511 was driven at a torque of 50 Nm and a revolving speed of 3000 rpm, and a differential pressure in the state where no PM is deposited on the honeycomb filter 100, that is, an initial pressure loss was measured.

Table 1 shows the measurement results thus obtained.

Table 1 collectively shows the average pore diameter a of the pores of the auxiliary filter layer, the average particle diameter b of the particles constituting the SCR catalyst, the collecting efficiency, the NOx conversion rate, and the initial pressure loss in the honeycomb filters in Example 1 and Comparative Example 1.

TABLE 1

| | Average pore diameter a (μm) | Average particle diameter b (μm) | Collecting efficiency (%) | NOx conversion rate (%) | Initial pressure loss (kPa) |
|---|---|---|---|---|---|
| Example 1 | 1.5 | 2.15 | 99.5 | 55 | 10 |
| Comparative Example 1 | 1.5 | 1.4 | 99.5 | 48 | 15 |

As apparent from Table 1, it was demonstrated that, in the honeycomb filter in Example 1, if the average pore diameter of the pores of the auxiliary filter layer was defined as a, and the average particle diameter of the particles constituting the SCR catalyst (zeolite particles) was defined as b, a portion that satisfied a<b was included.

On the other hand, it was demonstrated that in the honeycomb filter in Comparative Example 1, a<b was not satisfied.

As apparent from Table 1, in both the honeycomb filters of Example 1 and Comparative Example 1, the collecting efficiency exhibited a high value of 99.5%.

However, the NOx conversion rate of the honeycomb filter in Comparative Example 1 was a low value of 48%, while the NOx conversion rate of the honeycomb filter of Example 1 was a high value of 55%.

As described above, in the honeycomb filter in Comparative Example 1, the average pore diameter a of the pores of the auxiliary filter layer is larger than the average particle diameter b of the particles constituting the SCR catalyst (zeolite particles). Therefore, it is conceivable that the zeolite particles may partially enter into the auxiliary filter layer. As a result, the zeolite particles entering into the auxiliary filter layer are exposed to high temperatures and deteriorated so that the NOx conversion rate is decreased.

On the other hand, in the honeycomb filter in Example 1, since the average pore diameter a is smaller than the average particle diameter b, it is conceivable that the zeolite particles hardly enter into the auxiliary filter layer. Therefore, the high NOx conversion rate can be maintained.

Further, the honeycomb filter in Comparative Example 1 had a high initial pressure loss of 15 kPa, while the honeycomb filter in Example 1 had a low initial pressure loss of 10 kPa.

In the honeycomb filter in Example 1, since the average pore diameter a is smaller than the average particle diameter b, it is conceivable that the auxiliary filter layer is hardly clogged with the zeolite particles. Therefore, it is conceivable that an increase in the pressure loss can be prevented.

Thus, the honeycomb filter in Example 1 includes the portion in which the average pore diameter a is smaller than the average particle diameter b, and therefore, the PM collecting efficiency and the NOx conversion rate are good and an increase in the pressure loss can be suppressed.

Other Embodiments

In the honeycomb filter according to the first embodiment of the present invention, the auxiliary filter layer is formed on only the surface of the cell wall of the cell opened at the fluid inlet end and sealed at the fluid outlet end.

However, in a honeycomb filter according to another embodiment of the present invention, the auxiliary filter layer may be also formed on the surface of the cell wall of the cell sealed at the fluid inlet end and opened at the fluid outlet end, in addition to the surface of the cell wall of the cell opened at the fluid inlet end and sealed at the fluid outlet end.

Such a honeycomb filter can be produced by immersing the ceramic honeycomb substrate in a slurry containing spherical ceramic particles manufactured in advance, and then heating the ceramic honeycomb substrate.

In the production method for the honeycomb filter according to the embodiment of the present invention, the droplets may contain heat-resistant oxide particles as a raw material for the ceramic particles.

When the droplets contain the heat-resistant oxide particles, moisture in the droplets may be removed by heating the carrier gas to obtain the heat-resistant oxide particles. Then, by introducing the heat-resistant oxide particles into the cell, the auxiliary filter layer constituted of the heat-resistant oxide particles can be formed.

Alternatively, by introducing droplets containing the heat-resistant oxide particles and then, removing moisture in the droplets, the auxiliary filter layer constituted of the heat-resistant oxide particles can be formed.

In the honeycomb filter according to the embodiment of the present invention, the shape of the cells of the honeycomb fired bodies constituting the honeycomb filter in the cross section perpendicular to the longitudinal direction may be uniform, and the area of the cell sealed at one end face of the honeycomb fired body in the cross section perpendicular to the longitudinal direction may be equal to the area of the cell opened at the one end face of the honeycomb fired body in the cross section perpendicular to the longitudinal direction.

In the honeycomb filter according to the embodiment of the present invention, the ceramic honeycomb substrate (ceramic block) may include a single honeycomb fired body.

Such a honeycomb filter including a single honeycomb fired body is also called an integral honeycomb filter. The main constituent materials of the integral honeycomb filter may include cordierite or aluminum titanate.

In the honeycomb filter according to the embodiment of the present invention, the shape of each cell of the honeycomb fired body in the cross section perpendicular to the longitudinal direction of the honeycomb fired body is not limited to substantially quadrangular shape, and may be any shape including substantially circular shape, substantially elliptical shape, substantially pentagonal shape, substantially hexagonal shape, substantially trapezoidal shape, or substantially octagonal shape. Various shapes may coexist.

In the honeycomb filter of the embodiment of the present invention, there are following essential features: the auxiliary filter layer is formed on the surface of the cell wall of the ceramic honeycomb substrate, the SCR catalyst is supported on the surface of the cell wall of the ceramic honeycomb substrate, and given that the average pore diameter of the pores of the auxiliary filter layer is a (μm), and the average particle diameter of particles constituting the SCR catalyst is b (μm), the portion that satisfies a<b is included.

Desired effects can be obtained by appropriately combining the essential features with various configuration described in the first embodiment and other embodiments in detail (for example, the structure of the auxiliary filter layer, the method of forming the auxiliary filter layer, the cell structure of the honeycomb fired body, and the production steps of the honeycomb filter).

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb filter comprising:
    a ceramic honeycomb substrate having cell walls provided along a longitudinal direction of the ceramic honeycomb substrate to define cells through which fluid is to pass and which have a fluid inlet end and a fluid outlet end opposite to the fluid inlet end along the longitudinal direction, the cells including first cells and second cells, each of the first cells including an inlet opening end at the fluid inlet end and an outlet closed end at the fluid outlet end, each of the second cells including an inlet closed end at the fluid inlet end and an outlet opening end at the fluid outlet end;
    an auxiliary filter layer provided on first surfaces of first cell walls of the first cells;
    an SCR catalyst supported on second surfaces of second cell walls of the second cells, the second surfaces substantially corresponding to the first surfaces; and
    a portion that satisfies a<b, wherein
        "a" (μm) represents an average pore diameter of pores of the auxiliary filter layer, and
        "b" (μm) represents an average particle diameter of particles constituting the SCR catalyst.

2. The honeycomb filter according to claim 1, wherein a is from about 0.5 μm to about 3.0 μm, and b is from about 0.7 μm to about 5.0 μm.

3. The honeycomb filter according to claim 1, wherein the portion that satisfies a<b is about 40% or less of an entire honeycomb filter.

4. The honeycomb filter according to claim 1, wherein an average pore diameter of the cell walls is from about 15 μm to about 30 μm.

5. The honeycomb filter according to claim 1, wherein an amount of the supported SCR catalyst is from about 80 g/L to about 200 g/L.

6. The honeycomb filter according to claim 1, wherein a porosity of the cell walls is from about 55% to about 70%.

7. The honeycomb filter according to claim 1, wherein a thickness of the auxiliary filter layer is from about 3 μm to about 60 μm.

8. The honeycomb filter according to claim 1, wherein the auxiliary filter layer is made of a heat-resistant oxide.

9. The honeycomb filter according to claim 8, wherein the heat-resistant oxide comprises at least one of alumina, silica, mullite, ceria, cordierite, zirconia, and titania.

10. The honeycomb filter according to claim 1, wherein the auxiliary filter layer includes hollow particles.

11. The honeycomb filter according to claim 1, wherein the SCR catalyst comprises zeolite.

12. The honeycomb filter according to claim 1, wherein the SCR catalyst is not supported on a surface of the auxiliary filter layer.

13. The honeycomb filter according to claim 1, wherein more SCR catalyst is supported on the second surfaces of the second cell walls of the second cells than the first surfaces of the first cell walls of the first cells.

14. A production method for a honeycomb filter, comprising: producing a porous honeycomb fired body using a ceramic powder, the porous honeycomb fired body having cell walls provided along a longitudinal direction of the porous honeycomb fired body to define cells through which fluid is to pass and which have a fluid inlet end and a fluid outlet end opposite to the fluid inlet end along the longitudinal direction, the cells including first cells and second cells, each of the first cells including an inlet opening end at the fluid inlet end and an outlet closed end at the fluid outlet end, each of the second cells including an inlet closed end at the fluid inlet end and an outlet opening end at the fluid outlet end;
    dispersing droplets containing a raw material for ceramic particles in carrier gas;
    introducing the carrier gas into the first cells to provide an auxiliary filter layer on first surfaces of first cell walls of the first cells; and
    applying the SCR catalyst into the second cells to support SCR catalyst on second surfaces of second cell walls of the second cells, the second surfaces substantially corresponding to the first surfaces; and a portion that satisfies a<b, wherein "a" (μm) represents an average pore diameter of pores of the auxiliary filter layer, and "b" (μm) represents an average particle diameter of particles constituting the SCR catalyst.

15. The production method according to claim 14, wherein
    in the dispersing droplets, the droplets are dispersed in the carrier gas by spraying.

16. The production method according to claim 14, wherein
    the droplets contain a heat-resistant oxide precursor that provides a heat-resistant oxide by heating, the heat-resistant oxide being a raw material for the ceramic particles.

17. The production method according to claim 14, further comprising
    drying the carrier gas at about 100° C. to about 800° C.

18. The production method according to claim 14, further comprising
    heating a ceramic honeycomb substrate into which the carrier gas is introduced to about 900° C. to about 1500° C.

19. The production method according to claim 17, wherein
    the droplets contain a heat-resistant oxide precursor that provides a heat-resistant oxide by heating, the heat-resistant oxide being a raw material for the ceramic particles, and
    in the drying the carrier gas, the ceramic particles are provided from the droplets, each of the ceramic particles having a spherical shape.

20. The production method according to claim 14, wherein in the introducing the carrier gas, the ceramic particles are deposited on the first surface of the first cell walls to provide the auxiliary filter layer.

* * * * *